United States Patent
Yu et al.

(10) Patent No.: US 11,172,031 B2
(45) Date of Patent: Nov. 9, 2021

(54) SESSION MANAGEMENT METHOD AND APPARATUS

(71) Applicant: Huawei Technologies Co., Ltd., Shenzhen (CN)

(72) Inventors: Youyang Yu, Shanghai (CN); Hancheng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/723,646

(22) Filed: Dec. 20, 2019

(65) Prior Publication Data

US 2020/0128087 A1 Apr. 23, 2020

Related U.S. Application Data

(63) Continuation of application No. PCT/CN2018/090015, filed on Jun. 5, 2018.

(30) Foreign Application Priority Data

Jun. 20, 2017 (CN) .......................... 201710477812.9

(51) Int. Cl.
*H04L 29/08* (2006.01)
*H04W 76/11* (2018.01)
(Continued)

(52) U.S. Cl.
CPC ........ *H04L 67/146* (2013.01); *H04L 12/4633* (2013.01); *H04L 45/50* (2013.01); (Continued)

(58) Field of Classification Search
CPC ... H04L 67/146; H04L 12/4633; H04L 45/50; H04L 2212/00; H04W 76/11; H04M 7/126

See application file for complete search history.

(56) References Cited

U.S. PATENT DOCUMENTS 8,305,963 B1 11/2012 Breau et al.
2003/0037163 A1* 2/2003 Kitada ................ H04L 61/6022
709/236
(Continued)

FOREIGN PATENT DOCUMENTS

CN 102388639 A 3/2012
CN 102457444 A 5/2012
(Continued)

OTHER PUBLICATIONS

S2-172879, Secretary of SA WG2, "Draft Report of SA WG2 meeting #120", SA WG2 Meeting #121, Hangzhou, P. R. China, May 15-19, 2017, 403 pages.
(Continued)

*Primary Examiner* — Azizul Choudhury
(74) *Attorney, Agent, or Firm* — Conley Rose, P.C.

(57) ABSTRACT

A session management method and an apparatus, where the method includes: obtaining, by a session management function (SMF), a point-to-point protocol over Ethernet (PPPoE) message from a user equipment; assigning a PPPoE session identifier and/or an Internet Protocol (IP) address to the user equipment; and sending, by the SMF, the assigned PPPoE session identifier and/or IP address to the user equipment, to establish a PPPoE connection between the user equipment and a network side device. The method is performed after a packet data unit (PDU) session is successfully established. The SMF sends the PPPoE session identifier and/or the IP address to the user equipment. In this case, the user equipment can store a correspondence between the established PDU session and a PPPoE session, such that the user equipment accesses a 5G core network (CN) through a fixed network.

8 Claims, 7 Drawing Sheets

(51) Int. Cl.
*H04L 12/46* (2006.01)
*H04L 12/723* (2013.01)
*H04M 7/12* (2006.01)

(52) U.S. Cl.
CPC .......... *H04M 7/126* (2013.01); *H04W 76/11* (2018.02); *H04L 2212/00* (2013.01)

(56) References Cited

U.S. PATENT DOCUMENTS

| | | | |
|---|---|---|---|
| 2003/0167338 | A1 | 9/2003 | Hare et al. |
| 2007/0133576 | A1 | 6/2007 | Tsuge et al. |
| 2007/0263538 | A1 | 11/2007 | Hueck et al. |
| 2014/0185603 | A1 | 7/2014 | Kaippallimalil et al. |
| 2015/0080035 | A1 | 3/2015 | Tanaka et al. |
| 2015/0282026 | A1 | 10/2015 | Vigupta |
| 2018/0152832 | A1 | 5/2018 | Yu et al. |
| 2018/0359675 | A1 | 12/2018 | Chandramouli et al. |
| 2018/0359802 | A1 | 12/2018 | Cho et al. |
| 2019/0364420 | A1 | 11/2019 | Rommer et al. |
| 2020/0015311 | A1 | 1/2020 | Kim |
| 2020/0146077 | A1 | 5/2020 | Li et al. |
| 2020/0163145 | A1 | 5/2020 | Park et al. |
| 2021/0153111 | A1 | 5/2021 | Theimer et al. |

FOREIGN PATENT DOCUMENTS

| | | |
|---|---|---|
| CN | 102740401 A | 10/2012 |
| CN | 104170416 A | 11/2014 |
| CN | 104243297 A | 12/2014 |
| EP | 3582528 A1 | 12/2019 |
| EP | 3598693 A1 | 1/2020 |
| EP | 3618561 A1 | 3/2020 |
| JP | 2007104440 A | 4/2007 |
| JP | 2016506696 A | 3/2016 |
| KR | 20070020398 A | 2/2007 |
| WO | 2013154134 A1 | 10/2013 |
| WO | 2014122560 A2 | 8/2014 |
| WO | 2017078258 A1 | 5/2017 |
| WO | 2017095809 A1 | 6/2017 |

OTHER PUBLICATIONS

"3rd Generation Partnership Project; Technical Specification Group Services and System Aspects; Study on S2a Mobility based on GTP and WLAN access to EPC (SaMOG); Stage 2 (Release 12)," 3GPP TR 23.852 V2.0.0 (Sep. 2013), Sep. 9, 2013, 19 pages.

NTT Docomo, "TS 23.502: Captures dual-registration mobility procedure from EPC to 5GC," 3GPP TSG-SA WG2 Meeting #121, S2-174057, May 20, 2017, 13 pages.

Huawei, et al., "5WWC Architectural assumptions for the supporting of Wireless and Wireline convergence," 3GPP TSG-SA WG2 Meeting #122bis, S2-175626, Aug. 15, 2017, 8 pages.

Huawei, "Key Issues on supporting Wireline and Wireless Independent Core Network," 3BF-170014, 3GPP-BBF workshop SA2#119, Dubrovnik (Crotia), Feb. 2017, 7 pages.

"3rd Generation Partnership Project; Technical Specification Group Services and System Aspects; System Architecture for the 5G System; Stage 2 (Release 15)," 3GPP TS 23.501, V0.3.0, Feb. 2017, 97 pages.

"3rd Generation Partnership Project; Technical Specification Group Services and System Aspects; Procedures for the 5G System; Stage 2 (Release 15)," 3GPP TS 23.502, V0.2.0, Feb. 2017, 71 pages.

"3rd Generation Partnership Project; Technical Specification Group Services and System Aspects; Procedures for the 5G System; Stage 2 (Release 15)," 3GPP TS 23.502, V0.4.0, May 2017, 186 pages.

Ericsson, "Non-3GPP user plane," S2-166398, SA WG2 Meeting #118, Nov. 14-18, 2016, Reno, Nevada, USA, 5 pages.

Samsung, "Interaction between AMF and SMF," S2-170263, SA WG2 Meeting #118-BIS, Jan. 16-20, 2017 Spokane, WA, USA, 2 pages.

CATT, "SMF and UPF interactions," S2-171155, SA WG2 Meeting #S2-119, Feb. 13-17, 2017, Dubrovnik, Croatia, 2 pages.

Qualcomm Incorporated, "TS 23.502: MM and SM interactions for MICO Ues," S2-171709, SA WG2 Meeting #S2-120, Mar. 27-31, 2017, Busan, South Korea, 17 pages.

Huawei, et al., "TS 23.501: Relation between the SMF and UPF," S2-171870, SA WG2 Meeting #120, Mar. 27-31, 2017, Busan, Korea, 9 pages.

Nokia, et al., "23.502 § 4.9: no notion of SMF relocation (only UPF relocation or application of SSC mode)," S2-171934, SA WG2 Meeting #120, Mar. 27-31, 2017, Busan, South Korea, 4 pages.

NEC, "TS 23.502: Update to the SMF selection in PDU Session Establishment procedure," S2-171981, SA WG2 Meeting #120, Mar. 27-31, 2017, Busan, Korea, 6 pages.

T-Mobile USA Inc, "Enhancing IP Allocation between UPF and SMF," S2-172030, SA WG2 Meeting #120, Mar. 27-31, 2017, Busan, South Korea, 5 pages.

Broadband Forum, "Cooperation on 5G FMC," S2-172603, bbf2017.250.01,SA WG2 Meeting #120, Mar. 27-31, 2017, Busan, South Korea, 3 pages.

Foreign Communication From A Counterpart Application, PCT Application No. PCT/CN2018/079915, English Translation of International Search Report dated Jun. 19, 2018, 2 pages.

Foreign Communication From A Counterpart Application, PCT Application No. PCT/CN2018/079915, English Translation of Written Opinion dated Jun. 19, 2018, 3 pages.

Foreign Communication From A Counterpart Application, PCT Application No. PCT/CN2018/090015, English Translation of International Search Report dated Aug. 17, 2018, 3 pages.

Foreign Communication From A Counterpart Application, PCT Application No. PCT/CN2018/090015, English Translation of Written Opinion dated Aug. 17, 2018, 3 pages.

Foreign Communication From A Counterpart Application, PCT Application No. PCT/CN2018/089974, English Translation of International Search Report dated Aug. 27, 2018, 2 pages.

Foreign Communication From A Counterpart Application, PCT Application No. PCT/CN2018/089974, English Translation of Written Opinion dated Aug. 27, 2018, 4 pages.

* cited by examiner

US 11,172,031 B2

SESSION MANAGEMENT METHOD AND APPARATUS

CROSS-REFERENCE TO RELATED APPLICATIONS

This application is a continuation of International Patent Application No. PCT/CN2018/090015, filed on Jun. 5, 2018, which claims priority to Chinese Patent Application No. 201710477812.9, filed on Jun. 20, 2017. All of the aforementioned patent applications are hereby incorporated by reference in their entireties.

TECHNICAL FIELD

The present disclosure relates to the field of communications technologies, and in particular, to a session management method and an apparatus.

BACKGROUND

A user equipment (UE) is also referred to as customer-premises equipment (CPE). In this application document, in addition to a hardware entity directly operated by a user, the user equipment includes a hardware entity on a user side, for example, a residential gateway (RG), a fixed network residential gateway (FNRG), and the like.

To rise to a challenge of a wireless broadband technology and keep a leading advantage of a 3rd generation partnership project (3GPP) network, the 3GPP standard organization formulates a next generation mobile communications network architecture (NGS), which is referred to as a 5th Generation (5G) network architecture. The 5G network architecture not only supports access to a 5G core network (CN) using a wireless technology defined in the 3GPP standard organization, but also supports access to the 5G core network using a non-3GPP access technology and using a non-3GPP interworking function (N3IWF) or a next generation packet data gateway (ngPDG). The wireless technology defined in the 3GPP standard organization includes long term evolution (LTE), a 5G radio access network (RAN), or the like.

The 5G core network includes a user plane function (UPF) device and a control plane function (CPF) device. The user plane function device is mainly responsible for forwarding a data packet, controlling quality of service (QoS), collecting statistics about charging information, and the like. The control plane function device is mainly responsible for user registration authentication, mobility management, delivery of a data packet forwarding policy to the UPF, a QoS control policy, and the like, and may further include an access and mobility management function (AMF) device and a session management function (SMF) device. Specifically, the AMF is responsible for a registration procedure during access by the user equipment and location management in a movement process of the user equipment. The SMF is responsible for establishing a corresponding session connection on a network side when the user equipment initiates a service, and providing a specific service for the user equipment, especially delivering the data packet forwarding policy, the QoS policy, and the like to the UPF based on an interface NG4 between the SMF and the UPF.

Currently, the user equipment initiates session establishment in two forms: initiating access to a fixed network through the fixed network to establish a session, and initiating access to a mobile network through the mobile network to establish a session. Currently, the 5G CN does not support a case in which the user equipment accesses the 5G CN using the fixed network.

SUMMARY

A technical problem to be resolved in embodiments of the present disclosure is to provide a session management method and an apparatus, such that user equipment accesses a 5G CN through a fixed network. The 5G CN is referred to as a 5G converged core network in this application.

According to a first aspect, an embodiment of the present disclosure provides a session management method, including: obtaining, by a session management function (SMF), a point-to-point protocol over Ethernet (PPPoE) message sent by user equipment; assigning a PPPoE session identifier and/or an internet protocol (IP) address to the user equipment; and sending, by the SMF, the assigned PPPoE session identifier and/or IP address to the user equipment, to establish a PPPoE connection between the user equipment and a network side device.

This embodiment may be performed after a packet data unit (PDU) session is successfully established. The SMF sends the PPPoE session identifier and/or the IP address to the user equipment. In this case, the user equipment can store a correspondence between the established PDU session and a PPPoE session, such that the user equipment accesses a 5G CN through a fixed network.

The user equipment and the network side device establish the PPPoE connection. The network side device may be a UPF or the SMF in this embodiment. Based on a deployment requirement of the network side device, the PPPoE connection may be a PPPoE connection established with another network device. This is not uniquely limited.

In an optional implementation, before obtaining, by the SMF, a PPPoE message sent by user equipment, the method further includes: sending, by the SMF, a request message to a user plane function (UPF), where the request message is used to instruct the UPF to send the obtained PPPoE message to the SMF; or receiving, by the SMF, a non-access stratum (NAS) request message sent by the user equipment, where the NAS request message includes the PPPoE message.

The PPPoE message is a message used to establish a PPPoE session, and includes a PPPoE initiation (PADI) message, a PPPoE discovery (PADO) message, a PPPoE request (PADR) message, a PPPoE confirmation (PADS) message, a PPPoE terminate (PADT) message, a link control protocol (LCP) message, and an internet protocol control protocol (IPCP) message. The message may be sent using the user plane function device, or may be sent using the PPPoE message included in the NAS request message.

In an optional implementation, a representation form of the request message and specific content indicated by the request message are further provided as follows: That the request message is used to instruct the UPF to send the obtained PPPoE message to the SMF includes that the request message includes packet detection information (PDI), and the PDI is used to instruct the UPF to identify a data packet in which a type para meter that is in the data packet and that is included in an Ethernet packet header matches a PPPoE message type included in the PDI, and to send the matched data packet to the SMF, where optionally, in addition to a parameter related to Ethernet packet header, the Ethernet packet header may include a PPPoE packet header, or the Ethernet packet header is specifically the PPPoE packet header; or the request message includes packet detection information (PDI) and a forwarding action rule (FAR), the PDI is used to instruct the UPF to identify a data packet in which a type parameter that is in the data packet and that is included in an Ethernet packet header matches a PPPoE message type included in the PDI, and the forwarding action rule is used to instruct to send the matched data packet to the SMF.

In this embodiment, the SMF instructs, using the request message, the UPF to send the obtained PPPoE message to the SMF. In this case, the PPPoE message is sent to the SMF after the PPPoE message sent by the user equipment is identified, to implement a subsequent procedure related to the PPPoE session.

In an optional implementation, a solution in which the UPF is instructed to obtain the type parameter is further provided as follows: That the PDI is used to instruct the UPF to identify the type para meter that is in the data packet and that is included in the Ethernet packet header includes:

The PDI is used to instruct the UPF to identify layer 2 information of the data packet, to obtain the type parameter included in the Ethernet packet header.

In an optional implementation, a manner of sending the PPPoE session identifier and/or the IP address to the user equipment is further provided as follows: The sending the assigned PPPoE session identifier and/or IP address to the user equipment includes: encapsulating the PPPoE session identifier and/or the IP address in the PPPoE message, and sending the PPPoE message to the user equipment; or sending the assigned PPPoE session identifier and/or IP address to the user equipment using a NAS message.

In this embodiment, if both the PPPoE session identifier and the IP address are sent to the user equipment, the PPPoE session identifier and the IP address may be carried in different PPPoE messages. For example, the PPPoE session identifier is carried in the PADS message, and the IP address of the user equipment is carried in the IPCP message.

In an optional implementation, a solution in which the PPPoE message carries the PPPoE session identifier and/or the IP address is further provided as follows: If the encapsulating the PPPoE session identifier and/or the IP address in the PPPoE message, the method further includes: encapsulating the PPPoE message using a medium access control (MAC) address of the UPF as a source MAC address; and sending the PPPoE message to the user equipment includes: sending the encapsulated PPPoE message to the user equipment using the UPF.

In an optional implementation, a manner of obtaining subsequent authentication information is further provided. Details are as follows: receiving, by the SMF, a data packet that is sent by the UPF and that includes the PPPoE message, and obtaining at least one of a circuit number, a user equipment identifier, a user name, or a user password from the PPPoE message; or receiving, by the SMF, at least one of a circuit number, a user equipment identifier, a user name, or a user password that are sent by the UPF; or obtaining, by the SMF, at least one of a circuit number, a user equipment identifier, a user name, or a user password from the NAS message.

In an optional implementation, a manner in which the SMF performs authentication may be as follows: sending, by the SMF, the at least one of the circuit number, the user equipment identifier, the user name, or the user password to an access and mobility management function (AMF) and/or an authentication entity.

The authentication entity is an entity having an authentication function in a 5G CN, for example, an authentication server function (AUSF) entity, a unified data management (UDM) entity, or a third-party authentication function entity (for example, authentication, authorization, account (AM) entity).

In an optional implementation, a trigger condition that the SMF assigns the PPPoE session identifier and/or the IP address is further provided. Details are as follows: The assigning of a PPPoE session identifier and/or an IP address to the user equipment includes assigning, by the SMF, the PPPoE session identifier and/or the IP address to the user equipment according to an indication of an AMF or an indication of an authentication entity.

It may be understood that the AMF or the authentication entity usually performs authentication on the user equipment after receiving information such as the circuit number, the user equipment identifier, the user name, and the user password, and sends an indication to the SMF when authentication succeeds, such that the SMF assigns the PPPoE session identifier and/or the IP address to the user equipment.

In an optional implementation, a solution in which a PDU session is established is further provided as follows: Before obtaining, by a session management function (SMF), a PPPoE message sent by user equipment, the method further includes: receiving, by the SMF, a PDU session establishment request message, where the PDU session establishment request message includes a manner used to instruct the user equipment to obtain the IP address based on a PPPoE procedure, or includes information used to indicate a fixed network access type, or includes information used to indicate a fixed network service; or receiving, by the SMF, an IP index sent by a policy control function PCF, where the IP index is used to indicate a manner in which the user equipment obtains the IP address based on a PPPoE procedure.

In this embodiment, a manner of sending the PDU session establishment request message and content of information included in the PDU session establishment request message are provided. The information included in the PDU session establishment request message is used to enable the network side device to learn how to send the IP address and/or the PPPoE session identifier to the user equipment. The PDU session establishment request message may be sent in the NAS message.

In an optional implementation, a solution in which the SMF sends a MAC address of an access gateway function (AGF) to the user equipment is further provided. There is a correspondence between the MAC address of the AGF and the PDU session established by the user equipment. If a message sent by the user equipment carries the MAC address of the AGF, the network side may determine, based on the MAC address of the AGF, the PDU session corresponding to the message sent by the user equipment. Details are as follows: receiving, by the SMF, a medium access control (MAC) address that is of an access gateway function (AGF) and that is assigned by the AGF to a PDU session of the user equipment; and sending a PDU session establishment success message to the user equipment, where the PDU session establishment success message includes the MAC address of the AGF.

In an optional implementation, a solution in which the user equipment initiates a PPPoE session procedure is further provided. Because the MAC address of the AGF is used for encapsulation, the network side may learn of a PDU session to which the PPPoE session procedure is mapped. Details are as follows: If the request message is used to instruct the UPF to send the obtained PPPoE message to the SMF, after the sending a PDU session establishment success message to the user equipment, the method further includes receiving the PPPoE message that is from the user equipment and that is sent by the UPF, where the PPPoE message is used in a PPPoE discovery process, an internet protocol control protocol (I PCP) process, or a link control protocol (LCP) process.

The foregoing circuit number may be added to the PPPoE message by a Layer 2 (L2) access network device that is in an access network (AN) and that is before the AGF.

In this embodiment of the present disclosure, L2 is a data link, and L3 is a network layer.

According to a second aspect, an embodiment of the present disclosure further provides another session management method, including: receiving, by a user plane function (UPF), a request message from an SMF; obtaining a PPPoE message based on the request message; obtaining, by the UPF, a PPPoE session identifier and/or an IP address that are/is assigned to user equipment that sends the PPPoE message; and sending, by the UPF, the assigned PPPoE session identifier and/or IP address to the user equipment, to establish a PPPoE connection between the user equipment and a network side device.

The assigned PPPoE session identifier and/or IP address may be sent to the user equipment using the PPPoE message. The network side device may be the SMF or the UPF. The PPPoE session identifier and/or the IP address may be assigned by the SMF or the UPF.

In this embodiment, the UPF may parse the PPPoE message to obtain the PPPoE session identifier and/or the IP address, or send the PPPoE message to the SMF, and the SMF notifies the UPF of the PPPoE session identifier and/or the IP address after parsing the PPPoE message. Based on this in an optional implementation, a form of the request message is provided as follows: The request message includes that the request message is used to instruct the UPF to send the obtained PPPoE message to the SMF; or the request message is used to instruct the UPF to obtain the PPPoE message; or the request message carries the PPPoE message sent to the UPF.

In an optional implementation, if the UPF parses the PPPoE message to obtain the PPPoE session identifier and/or the IP address, a solution in which the SMF obtains authentication-related information is further provided as follows: If the request message is used to instruct the UPF to obtain the PPPoE message, the request message is further used to instruct to send, to the SMF, at least one of a circuit number, a user equipment identifier, a user name, or a user password that are carried in the PPPoE message.

In an optional implementation, content of the request message is further provided. To be more specific, a solution in which the SMF instructs the UPF to identify the PPPoE message is as follows: That the request message is used to instruct the UPF to obtain the PPPoE message includes that the request message includes packet detection information (PDI), and the PDI is used to instruct the UPF to identify a data packet in which a type parameter in the data packet matches a PPPoE message type included in the PDI, and to forward the identified data packet in the PPPoE message type to the SMF.

In an optional implementation, a solution in which the UPF obtains the PPPoE session identifier and/or the IP address is further provided as follows: If the request message is used to instruct the UPF to send the obtained PPPoE message to the SMF, obtaining a PPPoE session identifier and/or an IP address that are/is assigned to user equipment includes receiving, by the UPF, the PPPoE message sent by the SMF, where the PPPoE message includes the PPPoE session identifier and/or the IP address.

In an optional implementation, more content of the PPPoE message is further provided as follows.

In the PPPoE message, a MAC address of the UPF is a source MAC address.

In an optional implementation, a solution in which the UPF assigns the PPPoE session identifier and/or the IP address is further provided as follows: If the request message is used to instruct the UPF to obtain the PPPoE message, or if the request message carries the PPPoE message sent to the UPF, the obtaining a PPPoE message based on the request message includes: assigning, by the UPF, the PPPoE session identifier and/or the IP address to the user equipment; and the sending the assigned PPPoE session identifier and/or IP address to the user equipment includes: sending, by the UPF, a PPPoE reply message to the user equipment, and sending the assigned PPPoE session identifier and/or IP address to the user equipment using the PPPoE reply message.

In an optional implementation, a solution in which the UPF obtains authentication-related information is further provided as follows: receiving, by the UPF, at least one of a circuit number, a user equipment identifier, a user name, or a user password that are sent by the SMF; and sending the at least one of the circuit number, the user equipment identifier, the user name, or the user password to an authentication entity for authentication.

According to a third aspect, an embodiment of the present disclosure further provides a session management method, including: after establishing a PDU session, sending, by user equipment, a PPPoE message to a n access gateway function (AGF), where the PPPoE message is used in at least one of a PPPoE discovery process, an IPCP process, or an LCP process, and the PPPoE message is encapsulated using a MAC address that is of the AGF and that corresponds to the PDU session, or the PPPoE message is encapsulated using a MAC address that is of a UPF and that corresponds to a PPPoE session; and receiving a PPPoE session identifier or an IP address to establish a PPPoE connection between the user equipment and a network side device.

In this embodiment, the PPPoE session identifier or the IP address may be sent to the user equipment after being assigned by the UPF or an SMF. Therefore, the PPPoE session identifier or the IP address assigned by the UPF or the SMF to the user equipment may be received herein.

In this embodiment, the user equipment establishes the PDU session and establishes the PPPoE connection. In this way, the PDU session may correspond to the PPPoE session, such that a fixed network user plane and a 5G network user plane are combined.

In an optional implementation, a solution in which the PDU session is established is further provided. Details are as follows: Before sending a PPPoE message to an AGF, the method further includes: sending, by the user equipment, a PDU session establishment request message to the AGF, where the PDU session establishment request message includes the PPPoE message; or the PDU session establishment request message includes a manner used to instruct the user equipment to obtain the IP address based on a PPPoE procedure, or includes information used to indicate a fixed network access type, or includes information used to indicate a fixed network service.

In an optional implementation, a solution in which a NAS message is identified, such that an access network can identify the NAS message is further provided as follows: The PDU session establishment request message is encapsulated in a non-access stratum (NAS) message; and the NAS message is encapsulated in a layer 2 data packet, and the NAS message is identified using a virtual local area network (VLAN) label, or the NAS message is identified using an Ethernet type; or the NAS message is encapsulated in a layer 3 data packet, and the NAS message is identified using a user datagram protocol (UDP) port number or a predetermined destination IP address; or the NAS message is encapsulated in the PPPoE session, and the PPPoE session identifier is used to identify the NAS message; or the NAS message is encapsulated in a generic routing encapsulation (GRE) tunnel, and a GRE tunnel identifier is used to identify the NAS message; or the NAS message is encapsulated in an extensible authentication protocol (EAP) message, and the NAS message is identified using an EAP parameter; or the NAS message is encapsulated in a predetermined protocol layer, and the NAS message is identified using the predetermined protocol layer.

In an optional implementation, an implementation solution in which the MAC address of the AGF is obtained is further provided. The method further includes receiving, by the user equipment, a PDU session establishment success message returned by the AGF or an SMF, where the PDU session establishment success message includes the MAC address that is of the AGF and that is assigned by the AGF to the PDU session, or the PDU session establishment success message is encapsulated in the MAC address that is of the AGF and that is assigned by the AGF to the PDU session.

The MAC address of the AGF is a MAC address that is in a correspondence with the PDU session. If the user equipment encapsulates the message using the MAC address of the AGF, the network side device may determine, based on the MAC address of the AGF, that the message is mapped to the PDU session.

In an optional implementation, a solution in which the MAC address of the UPF is obtained is further provided. Details are as follows: receiving, by the user equipment, a PPPoE reply message, where the PPPoE reply message is encapsulated in the MAC address of the UPF, and the MAC address of the UPF is the MAC address that is of the UPF and that corresponds to the PPPoE session.

According to a fourth aspect, an embodiment of the present disclosure further provides a session management method, including: receiving, by an AGF, a PPPoE message sent by user equipment, where the PPPoE message is used in a PPPoE discovery process, an internet protocol control protocol (IPCP) process, or an LCP process, and the PPPoE message is encapsulated using a MAC address of the AGF or a MAC address of a UPF; determining, by the AGF, a PDU session corresponding to the MAC address of the AGF, and forwarding the PPPoE message to the UPF corresponding to the PDU session; or sending, by the AGF, the PPPoE message to the UPF based on the MAC address of the UPF; receiving a PPPoE session identifier and/or an IP address that are/is returned by an access and mobility management function (AMF) or the UPF; and forwarding the PPPoE session identifier and/or the IP address to the user equipment, such that the user equipment establishes a PPPoE connection to a network side device.

In this embodiment, the PPPoE message received by the AGF is encapsulated in an Ethernet packet header. The Ethernet packet header includes the MAC address of the AGF. Therefore, the AGF may determine, based on the MAC address of the AGF, that the Ethernet packet header is mapped to a PDU session, to forward the PPPoE message to a corresponding UPF. After the PPPoE session identifier and/or the IP address are/is returned to the user equipment, because the user equipment has established the PDU session, then establishes a PPPoE session based on the PDU session, and establishes a correspondence between the PDU session and the PPPoE session, to implement a 5G converged core network.

In this embodiment, an L2 packet header is encapsulated at an outer layer of the PPPoE message, and the L2 packet header includes the MAC address of the AGF.

In an optional implementation, content included in a PDU session establishment request message is further provided as follows: Before receiving a PPPoE message sent by user equipment, the method further includes: receiving, by the AGF, a PDU session establishment request message sent by the user equipment, where the PDU session establishment request message includes a manner used to instruct the user equipment to obtain the IP address based on a PPPoE procedure, or includes information used to indicate a fixed network access type, or includes information used to indicate a fixed network service; and forwarding the PDU session establishment request message to an AMF.

In an optional implementation, an optional implementation solution in which a NAS message is identified is further provided as follows: The PDU session establishment request message is encapsulated in an NAS message; and the NAS message is encapsulated in a layer 2 data packet, and the NAS message is identified using a virtual local area network (VLAN) label, a multiprotocol label switching (MPLS) label, or the MAC address of the AGF, or the NAS message is identified using an Ethernet type; or the NAS message is encapsulated in a layer 3 data packet, and the NAS message is identified using a UDP port number or a predetermined destination IP address; or the NAS message is encapsulated in a PPPoE session, and the PPPoE session identifier is used to identify the NAS message; or the NAS message is encapsulated in a GRE tunnel, and a GRE tunnel identifier is used to identify the NAS message; or the NAS message is encapsulated in an EAP message, and the NAS message is identified using an EAP parameter; or the NAS message is encapsulated in a predetermined protocol layer, and the NAS message is identified using the predetermined protocol layer.

In this embodiment, the NAS message is identified, such that the AGF can distinguish between the NAS message and user plane data. In this way, the AGF may send the NAS message to the AMF, and needs to send the user plane data to the UPF. In this embodiment, all messages may be collectively referred to as the NAS message. There is no need to distinguish between specific messages. For example, there is no need to distinguish among a PDU session establishment success message, the PDU session establishment request message, and the like.

In an optional implementation, a circuit number may be added to the NAS message by an L2 access network device before the AGF, and then the NAS message forwarded by the AGF includes the circuit number. Details are as follows: forwarding, by the AGF, the NAS message, where the NAS message includes a number of a circuit accessed by the user equipment.

In an optional implementation, a solution in which the AGF assigns the MAC address of the AGF to the PDU session, such that the AGF maps the PDU session to the MAC address of the AGF is further provided. Details are as follows: assigning, by the AGF, the MAC address of the AGF to the PDU session, and sending the assigned MAC address of the AGF to the user equipment.

Subsequently, the user equipment sends data packets that include the MAC address of the AGF, and the AGF may map these data packets to the PDU session. In an optional implementation, a solution in which the MAC address of the AGF is sent to the user equipment is further provided as follows: Sending the assigned MAC address of the AGF to the user equipment includes: encapsulating a PDU session establishment success message using the MAC address of the AGF; and sending the PDU session establishment success message to the user equipment; or sending the MAC address of the AGF to an SMF, such that the SMF adds the MAC address of the AGF to the PDU session establishment success message, and sends the PDU session establishment success message to the user equipment.

According to a fifth aspect, an embodiment of the present disclosure further provides a session management method, including: receiving, by a mobility management function (AMF), a PDU session establishment request message sent by an AGF, where the PDU session establishment request message includes a manner used to instruct user equipment to obtain an IP address based on a PPPoE procedure, or includes information used to indicate a fixed network access type, or includes information used to indicate a fixed network service; and receiving, by the AMF, a PDU session establishment success message returned by an SMF, and sending the PDU session establishment success message to the user equipment using the AGF; or receiving, by the AMF, a MAC address that is of the AGF and that is assigned by the AGF to a PDU session, and sending the MAC address of the AGF to the SMF.

In this embodiment, an implementation solution in which the AMF participates in a PDU session establishment process of the user equipment is provided.

In an optional implementation, an SMF selection solution is further provided as follows: selecting, by the AMF, the SMF according to the indication information in the PDU session establishment request message; and sending the PDU session establishment request message to the SMF.

In an optional implementation, a solution in which authentication-related information is obtained is further provided as follows: sending, by the AMF, an instruction to the SMF, to instruct the SMF to obtain at least one of a circuit number, a user equipment identifier, a user name, or a user password.

In an optional implementation, an authentication solution is further provided. Details are as follows: After sending, by the AMF, an instruction to the SMF, the method further includes: receiving, by the AMF, at least one of a circuit number, a user equipment identifier, a user name, or a user password that are sent by the SMF; sending the at least one of the circuit number, the user equipment identifier, the user name, or the user password to an authentication entity; sending, by the AMF, an authentication success indication to the SMF, where the authentication success indication is used to notify the SMF of the user equipment on which authentication succeeds; and when authentication on the user equipment succeeds, indicating, by the AMF to the SMF, that authentication on the user equipment succeeds.

According to a sixth aspect, an embodiment of the present disclosure further provides a session management function device, including: an obtaining unit configured to obtain a point-to-point protocol over Ethernet (PPPoE) message sent by user equipment; an assignment unit configured to assign a PPPoE session identifier and/or an IP address to the user equipment; and a sending unit configured to send the assigned PPPoE session identifier and/or IP address to the user equipment, to establish a PPPoE connection between the user equipment and a network side device.

The SMF may include a connection establishment unit configured to establish a PPPoE connection between the user equipment and the SMF.

In an optional implementation, the sending unit is further configured to, before the PPPoE message is obtained, send a request message to a user plane function (UPF), where the request message is used to instruct the UPF to send the obtained PPPoE message to the SMF.

Alternatively, the session management function device further includes: a receiving unit configured to, before the PPPoE message is obtained, receive an NAS request message sent by the user equipment, where the NAS request message includes the PPPoE message.

In an optional implementation, that the request message is used to instruct the UPF to send the obtained PPPoE message to the SMF includes that the request message includes PDI, and the PDI is used to instruct the UPF to identify a data packet in which a type parameter that is in the data packet and that is included in an Ethernet packet header matches a PPPoE message type included in the PDI, and to send the matched data packet to the SMF; or the request message includes PDI and a forwarding action rule (FAR), the PDI is used to instruct the UPF to identify a data packet in which a type parameter that is in the data packet and that is included in an Ethernet packet header matches a PPPoE message type included in the PDI, and the forwarding action rule is used to instruct to send the matched data packet to the SMF.

In an optional implementation, that the PDI is used to instruct the UPF to identify the type parameter that is in the data packet and that is included in the Ethernet packet header includes the following.

The PDI is used to instruct the UPF to identify layer 2 information of the data packet, to obtain the type parameter included in the Ethernet packet header.

In an optional implementation, that the sending unit is configured to send the assigned PPPoE session identifier and/or IP address to the user equipment includes: encapsulating the PPPoE session identifier and/or the IP address in the PPPoE message; and sending the PPPoE message to the user equipment; or sending the assigned PPPoE session identifier and/or IP address to the user equipment using a NAS message.

In an optional implementation, the sending unit is further configured to: if encapsulating the PPPoE session identifier and/or the IP address in the PPPoE message, encapsulate the PPPoE message using a MAC address of the UPF as a source MAC address; and send the encapsulated PPPoE message to the user equipment using the UPF.

In an optional implementation, the obtaining unit is further configured to: receive a data packet that is sent by the UPF and that includes the PPPoE message; and obtain at least one of a circuit number, a user equipment identifier, a user name, or a user password from the PPPoE message. Alternatively, the obtaining unit is configured to receive at least one of a circuit number, a user equipment identifier, a user name, or a user password that are sent by the UPF. Alternatively, the obtaining unit is configured to obtain at least one of a circuit number, a user equipment identifier, a user name, or a user password from the NAS message.

In an optional implementation, the sending unit is further configured to send the at least one of the circuit number, the user equipment identifier, the user name, or the user password to an AMF and/or an authentication entity.

In an optional implementation, that an assignment unit is configured to assign a PPPoE session identifier and/or an IP address to the user equipment includes assigning the PPPoE session identifier and/or the IP address to the user equipment according to an indication of the AMF or an indication of the authentication entity.

In an optional implementation, the session management function device further includes: a receiving unit configured to, before the SMF obtains the PPPoE message sent by the user equipment, receive a packet data unit PDU session establishment request message, where the PDU session establishment request message includes a manner used to instruct the user equipment to obtain the IP address based on a PPPoE procedure, or includes information used to indicate a fixed network access type, or includes information used to indicate a fixed network service; or receive an IP index sent by a policy control function PCF, where the IP index is used to indicate a manner in which the user equipment obtains the IP address based on a PPPoE procedure.

In an optional implementation, the session management function device further includes the following.

The receiving unit is configured to receive a MAC address that is of an AGF and that is assigned by the AGF to a PDU session of the user equipment.

The sending unit is further configured to send a PDU session establishment success message to the user equipment, where the PDU session establishment success message includes the MAC address of the AGF.

In an optional implementation, the receiving unit is further configured to, if the request message is used to instruct the UPF to send the obtained PPPoE message to the SMF, after the PDU session establishment success message is sent to the user equipment, receive the PPPoE message that is from the user equipment and that is sent by the UPF, where the PPPoE message is used in a PPPoE discovery process, an IPCP process, or an LCP process.

According to a seventh aspect, an embodiment of the present disclosure further provides a user plane function device, including: a receiving unit configured to receive a request message from an SMF; an information obtaining unit configured to: obtain a PPPoE message based on the request message; and obtain a PPPoE session identifier and/or an IP address that are/is assigned to user equipment that sends the PPPoE message; and a sending unit configured to send the PPPoE session identifier and/or the IP address to the user equipment, to establish a PPPoE connection between the user equipment and a network side device.

The user plane function device may further include a connection establishment unit configured to establish a PPPoE connection between the user equipment and the user plane function device.

In an optional implementation, the request message includes that the request message is used to instruct the UPF to send the obtained PPPoE message to the SMF; or the request message is used to instruct the UPF to obtain the PPPoE message; or the request message carries the PPPoE message sent to the UPF.

In an optional implementation, if the request message is used to instruct the UPF to obtain the PPPoE message, the request message is further used to instruct to send, to the SMF, at least one of a circuit number, a user equipment identifier, a user name, or a user password that are carried in the PPPoE message.

In an optional implementation, that the request message is used to instruct the UPF to obtain the PPPoE message includes that the request message includes PDI, and the PDI is used to instruct the UPF to identify a data packet in which a type parameter in the data packet matches a PPPoE message type included in the PDI, and to forward the identified data packet in the PPPoE message type to the SMF.

In an optional implementation, the information obtaining unit is configured to, if the request message is used to instruct the UPF to send the obtained PPPoE message to the SMF, receive the PPPoE message sent by the SMF, where the PPPoE message includes the PPPoE session identifier and/or the IP address.

In an optional implementation, in the PPPoE message, a MAC address of the UPF is a source MAC address.

In an optional implementation, the information obtaining unit is configured to, if the request message is used to instruct the UPF to obtain the PPPoE message, or if the request message carries the PPPoE message sent to the UPF, assign the PPPoE session identifier and/or the IP address to the user equipment based on the request message.

The sending unit is configured to send a PPPoE reply message to the user equipment, and send the assigned PPPoE session identifier and/or IP address to the user equipment using the PPPoE reply message.

In an optional implementation, the receiving unit is further configured to receive at least one of a circuit number, a user equipment identifier, a user name, or a user password that are sent by the SMF.

The sending unit is further configured to send the at least one of the circuit number, the user equipment identifier, the user name, or the user password to an authentication entity for authentication.

According to an eighth aspect, an embodiment of the present disclosure further provides user equipment, including: a sending unit configured to: after a packet data unit PDU session is established, send a PPPoE message to an AGF, where the PPPoE message is used in at least one of a PPPoE discovery process, an IPCP process, or an LCP process, and the PPPoE message is encapsulated using a MAC address that is of the AGF and that corresponds to the PDU session, or the PPPoE message is encapsulated using a MAC address that is of a UPF and that corresponds to a PPPoE session; and a receiving unit configured to receive a PPPoE session identifier or an IP address, to establish a PPPoE connection between the user equipment and a network side device.

In an optional implementation, the sending unit is further configured to before sending the PPPoE message to the AGF, send a PDU session establishment request message to the AGF, where the PDU session establishment request message includes the PPPoE message. Alternatively, the PDU session establishment request message includes a manner used to instruct the user equipment to obtain the IP address based on a PPPoE procedure, or includes information used to indicate a fixed network access type, or includes information used to indicate a fixed network service.

In an optional implementation, the PDU session establishment request message is encapsulated in an NAS message; and the NAS message is encapsulated in a layer 2 data packet, and the NAS message is identified using a VLAN label, a multiprotocol label switching (MPLS) label, or the MAC address of the AGF, or the NAS message is identified using an Ethernet type; or the NAS message is encapsulated in a layer 3 data packet, and the NAS message is identified using a UDP port number or a predetermined destination IP address; or the NAS message is encapsulated in the PPPoE session, and the PPPoE session identifier is used to identify the NAS message; or the NAS message is encapsulated in a GRE tunnel, and a GRE tunnel identifier is used to identify the NAS message; or the NAS message is encapsulated in an EAP message, and the NAS message is identified using an EAP parameter; or the NAS message is encapsulated in a predetermined protocol layer, and the NAS message is identified using the predetermined protocol layer.

In an optional implementation, the receiving unit is further configured to receive a PDU session establishment success message returned by the AGF or an SMF, where the PDU session establishment success message includes the MAC address that is of the AGF and that is assigned by the AGF to the PDU session, or the PDU session establishment success message is encapsulated in the MAC address that is of the AGF and that is assigned by the AGF to the PDU session.

In an optional implementation, the receiving unit is further configured to receive a PPPoE reply message, where the PPPoE reply message includes the MAC address that is of the UPF and that corresponds to the PPPoE session.

According to a ninth aspect, an embodiment of the present disclosure further provides an access gateway function device, including: a receiving unit configured to receive a PPPoE message sent by user equipment, where the PPPoE message is used in a PPPoE discovery process, an IPCP process, or an LCP process, and the PPPoE message is encapsulated using a MAC address of the AGF or a MAC address of a UPF; a session determining unit configured to determine a packet data unit PDU session corresponding to the MAC address of the AGF; and a sending unit configured to: forward the PPPoE message to the UPF corresponding to the PDU session; or send the PPPoE message to the UPF based on the MAC address of the UPF, where the receiving unit is further configured to receive a PPPoE session identifier and/or an IP address; and the sending unit is further configured to forward the PPPoE session identifier and/or the IP address to the user equipment, such that the user equipment establishes a PPPoE connection to a network side device.

In an optional implementation, the receiving unit is further configured to, before receiving the PPPoE message sent by the user equipment, receive a PDU session establishment request message sent by the user equipment, where the PDU session establishment request message includes a manner used to instruct the user equipment to obtain the IP address based on a PPPoE procedure, or includes information used to indicate a fixed network access type, or includes information used to indicate a fixed network service.

The sending unit is further configured to forward the PDU session establishment request message to an AMF.

In an optional implementation, the PDU session establishment request message is encapsulated in an NAS message; and the NAS message is encapsulated in a layer 2 data packet, and the NAS message is identified using a virtual local area network (VLAN) label, a multiprotocol label switching (MPLS) label, or the MAC address of the AGF, or the NAS message is identified using an Ethernet type; or the NAS message is encapsulated in a layer 3 data packet, and the NAS message is identified using a UDP port number or a predetermined destination IP address; or the NAS message is encapsulated in a PPPoE session, and the PPPoE session identifier is used to identify the NAS message; or the NAS message is encapsulated in a GRE tunnel, and a GRE tunnel identifier is used to identify the NAS message; or the NAS message is encapsulated in an EAP message, and the NAS message is identified using an EAP parameter; or the NAS message is encapsulated in a predetermined protocol layer, and the NAS message is identified using the predetermined protocol layer.

In an optional implementation, the sending unit is further configured to forward the NAS message, where the NAS message includes a number of a circuit accessed by the user equipment.

In an optional implementation, the access gateway function device further includes an address assignment unit, configured to assign the MAC address of the AGF to the PDU session, where the sending unit is further configured to send the assigned MAC address of the AGF to the user equipment.

In an optional implementation, that the sending unit is configured to send the assigned MAC address of the AGF to the user equipment includes: encapsulating a PDU session establishment success message using the MAC address of the AGF, and sending the PDU session establishment success message to the user equipment; or sending the MAC address of the AG Fto an SMF, such that the SMF adds the MAC address of the AGF to the PDU session establishment success message, and sends the PDU session establishment success message to the user equipment.

According to a tenth aspect, an embodiment of the present disclosure further provides a mobility management function device, including: a receiving unit configured to receive a packet data unit PDU session establishment request message sent by an AGF, where the PDU session establishment request message includes a manner used to instruct user equipment to obtain an IP address based on a PPPoE procedure, or includes information used to indicate a fixed network access type, or includes information used to indicate a fixed network service, where the receiving unit is further configured to receive a PDU session establishment success message returned by an SMF; and a sending unit configured to send the PDU session establishment success message to the user equipment using the AGF.

Alternatively, the receiving unit is configured to receive a MAC address that is of the AGF and that is assigned by the AGF to a PDU session. The sending unit is configured to send the MAC address of the AGF to the SMF.

In an optional implementation, the mobility management function device further includes a selection unit configured to select the SMF according to the indication information in the PDU session establishment request message, where the sending unit is further configured to send the PDU session establishment request message to the SMF.

In an optional implementation, the sending unit is further configured to send an instruction to the SMF, to instruct the SMF to obtain at least one of a circuit number, a user equipment identifier, a user name, or a user password.

In an optional implementation, the receiving unit is further configured to, after the instruction is sent to the SMF, receive the at least one of the circuit number, the user equipment identifier, the user name, or the user password that are sent by the SMF.

The sending unit is further configured to send the at least one of the circuit number, the user equipment identifier, the user name, and the user password to an authentication entity.

The sending unit is further configured to, when authentication on the user equipment succeeds, indicate, to the SMF, that authentication on the user equipment succeeds.

According to an eleventh aspect, an embodiment of the present disclosure further provides an electronic device, including an input/output device, a processor, and a memory.

The memory stores an executable instruction, and the processor executes the executable instruction to implement any method procedure provided in the embodiments of the present disclosure.

According to a twelfth aspect, an embodiment of the present disclosure further provides a computer storage medium. The computer storage medium includes an executable instruction, and when the executable instruction is executed, any method procedure provided in the embodiments of the present disclosure is implemented.

According to a thirteenth aspect, an embodiment of the present disclosure further provides a computer program product. The computer program product includes an executable instruction, and when the executable instruction is executed, any method procedure provided in the embodiments of the present disclosure is implemented.

BRIEF DESCRIPTION OF DRAWINGS

To describe the technical solutions in the embodiments or the background of the present disclosure more clearly, the following describes the accompanying drawings required for the embodiments or the background of the present disclosure.

DESCRIPTION OF EMBODIMENTS

The embodiments of the present disclosure are described below with reference to the accompanying drawings in the embodiments of the present disclosure.

Figure 1:
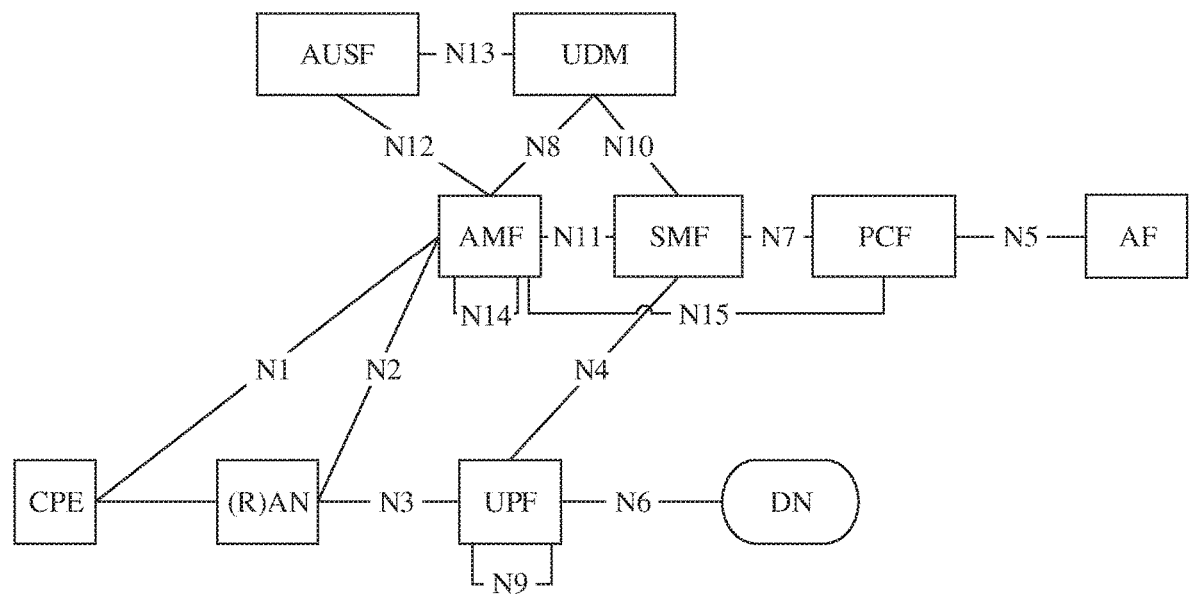
FIG. 1 is a schematic architectural diagram of a 5G system according to an embodiment of the present disclosure.

FIG. 1 shows a system example of a 5G communications system. In FIG. 1, the 5G communications system includes a UE, a radio access network (RAN) or an access network (AN), a user plane function (UPF), a data network (DN), an AMF, an SMF, a policy control function (PCF), an application function (AF), an authentication server function (AUSF), and a unified data management (UDM). Interfaces N1 to N15 are respectively used for communication.

Figure 2:
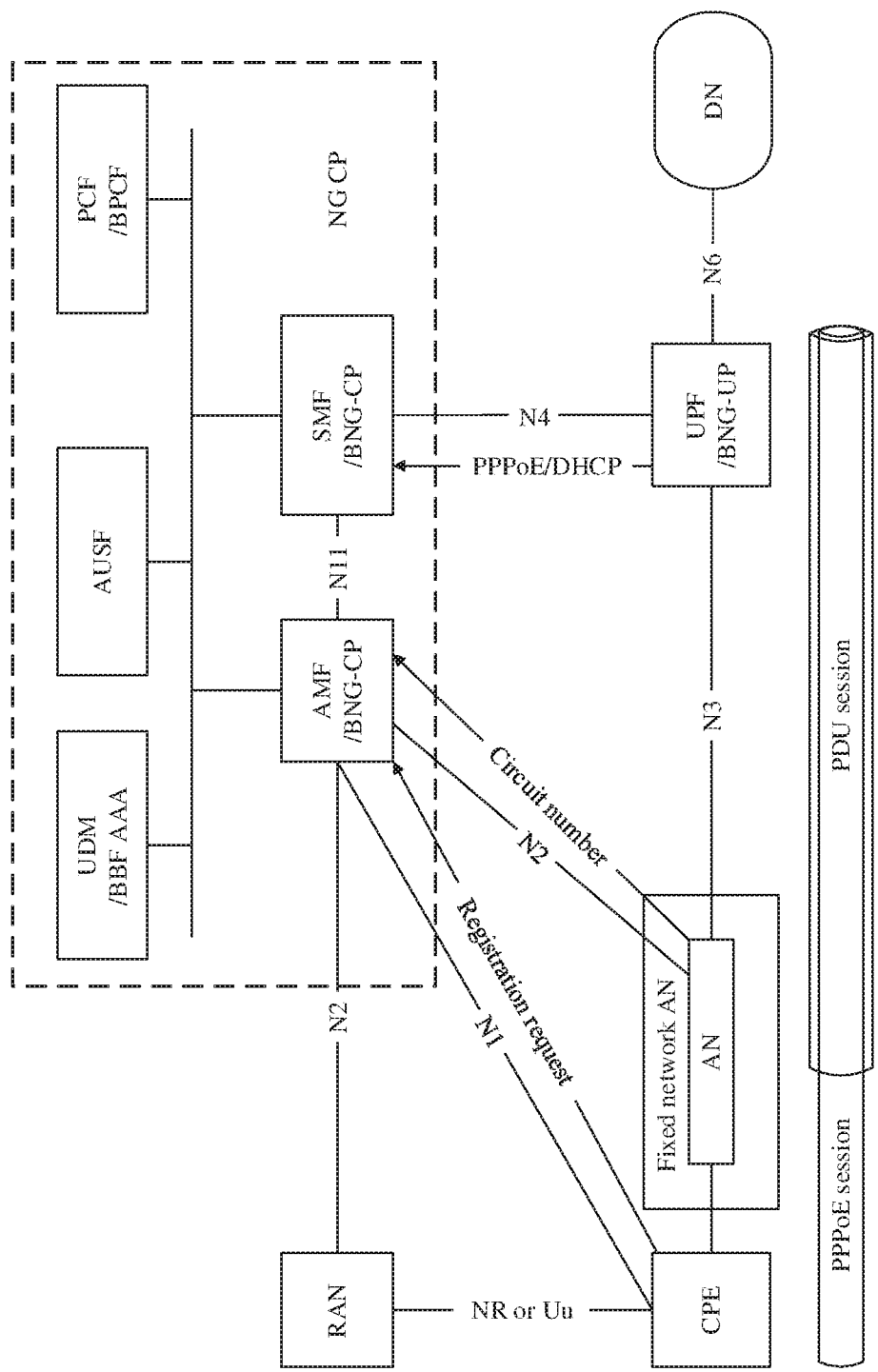
FIG. 2 is a schematic architectural diagram of a system of a 5G converged core network according to an embodiment of the present disclosure.

FIG. 2 is a schematic diagram of a system of a 5G converged core network according to an embodiment of the present disclosure. Referring to a structure of the 5G communications system in FIG. 1, in FIG. 2, a dashed-line box part shows a next generation control plane function (NGCP). A fixed network AN is newly added to an access network side. At a location of CPE, the CPE may alternatively be UE, an RG, an FNRG, or a wireless fidelity (wifi) access point (AP). The fixed network AN communicates with the UPF through a n interface N3. In addition, in FIG. 2, the UPF may be mapped to a broadband network gateway-user plane function (BNG-UP), namely, a fixed network user plane function device. The AMF and the SMF are mapped to a broadband network gateway control plane function (BNG-CP) in a fixed network. The UDM is mapped to a bearer binding function (BBF) and an authentication, authorization and accounting (AAA) server in the fixed network. The PCF is mapped to a broadband policy control function (BPCF) in the fixed network. The CPE and the RAN may communicate with each other through a residential area network (NR) or an interface Uu. FIG. 2 includes a point-to-point protocol over Ethernet (PPPoE) session and a packet data unit (PDU) session. FIG. 2 further shows that the CPE sends a registration request to the AMF, and the UPF sends, to the SMF, information related to PPPoE and a dynamic host configuration protocol (DHCP). In FIG. 2, the fixed network user plane function (UPF) and a core network user plane function (CN-UPF) are combined.

The AMF device, the SMF device, the UPF device, and the PCF device may be briefly referred to as an AMF, an SMF, a UPF, and a PCF respectively.

Figure 3A:
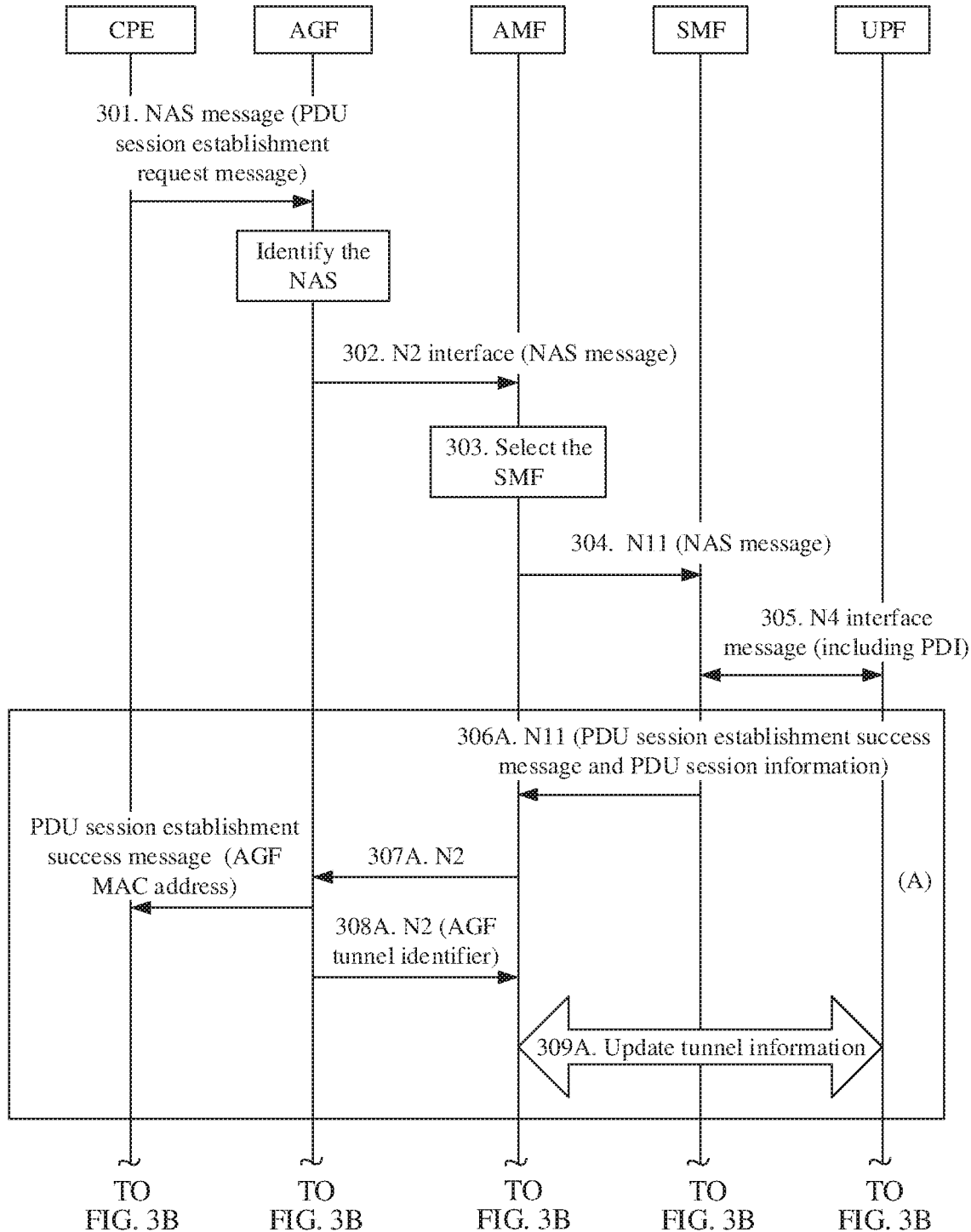
FIG. 3A and FIG. 3B are schematic flowcharts of a method according to an embodiment of the present disclosure.
Figure 3B:
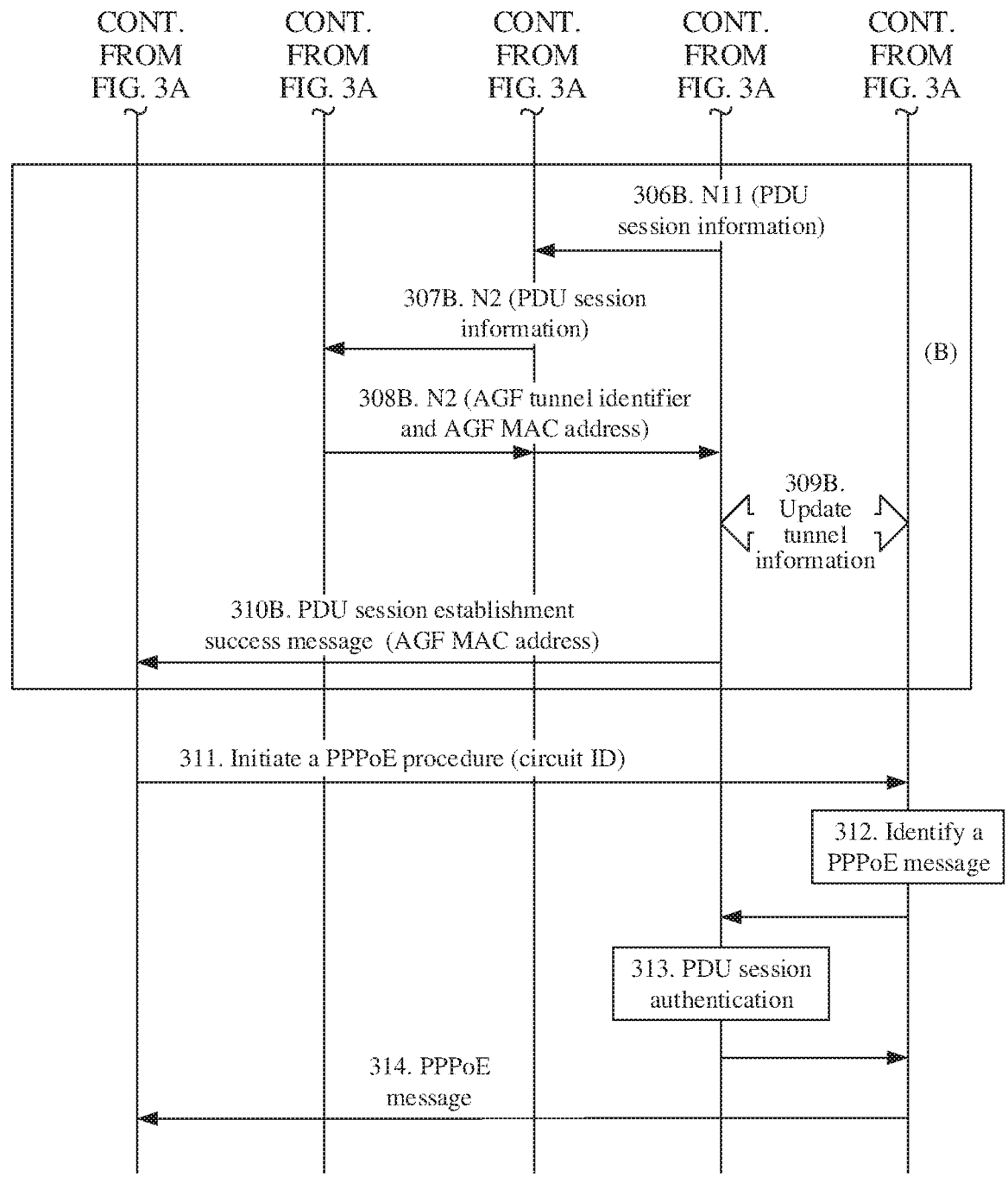

As shown in FIG. 3A and FIG. 3B, based on the system of the 5G converged core network shown in FIG. 2, the following provides a schematic flowchart in which user equipment accesses a 5G CN through a fixed network. In FIG. 3A and FIG. 3B, an access gateway function (AGF) is an upper layer convergence point in the AN, is deployed on an access network side in the fixed network, and is mapped to the fixed network AN in FIG. 2.

First, the CPE is registered with a network side, and a specific procedure in which the CPE is registered with the network side may comply with a current communications protocol. Details are not described herein.

301. The CPE initiates a PDU session related procedure using a non-access stratum (NAS) message.

The PDU session related procedure may include a PDU session establishment request message, a PDU session modification message, a PDU session deletion message, or the like. The PDU session establishment request message is used as an example below for description.

The PDU session establishment request message may include a user equipment identifier (CPE ID), a PDU session identifier (ID), a network identifier (for example, a digital data network (DDN)), slice information, a type identifier, and the like.

The network identifier may be set to a fixed network service identifier, for example, a web television (IPTV) service.

The slice information may be set to a slice identifier related to the fixed network.

The type identifier may be an Internet Protocol (IP) address obtaining manner, a session type parameter, or the like. The IP address obtaining manner is a manner in which the CPE receives an IP address. The session type parameter is used to notify the network side of the manner in which the CPE obtains the IP address. The CPE may set the type identifier based on a service and configuration information.

For example, if the CPE senses, through a port, that an IPTV is online, the IP address may be obtained for this type of service based on an internet protocol over Ethernet (IPoE). In this case, the CPE may set the type identifier to DHCP, a manner in which IP address obtaining is deferred, an IPoE obtaining manner, or the like. If the CPE senses, through a port, that a personal computer (PC) is online, the CPE sets the type identifier to a PPPoE, an Ethernet type, an unstructured type, or the like based on the configuration information.

A function of the type identifier is to notify the network side of the IP address obtaining manner, to be specific, to notify the network side of a manner in which the IP address corresponding to a PDU session is sent to the CPE. The type identifier belongs to optional information. If the CPE does not send the type identifier, or the CPE sends the type identifier but the network side does not use the type identifier, the SMF may obtain, from the PCF, the manner in which the IP address is sent to the CPE. The PCF may determine, based on a fixed network access type and/or a service type that are/is received from the SMF, the manner in which the IP address is sent to the CPE, and notify the SMF of the manner. The type identifier may be defined as an IP address index.

The CPE may encapsulate the NAS message in a Layer 2 (L2) or Layer 3 (L3) data packet. A specific implementation solution is as follows.

L2 encapsulation solution: The CPE encapsulates the NAS message in an Ethernet packet, and uses a special virtual local area network (VLAN) label to indicate that the Ethernet packet includes the NAS message. The special VLAN label may be pre-configured on a CPE side and an AGF side, and is used to encapsulate and identify the NAS message.

L3 encapsulation solution: The CPE encapsulates the NAS message in an IP packet/a user datagram protocol (UDP) packet, and encapsulates a NAS data packet using a special UDP port number or a special IP address, and the AGF identifies the NAS message based on the special UDP port number or the special IP address.

A manner in which the CPE encapsulates the NAS message and content included in the NAS message may also have other examples in the summary. As an application example, this embodiment should not be construed as a uniqueness limitation on this embodiment of the present disclosure.

302. The AGF forwards the NAS message to the AMF through an interface N2.

An N2 interface message may be an initial user equipment message, an uplink NAS transmission message, or the like. This is not limited in this embodiment of the present disclosure.

Optionally, the AGF may send a circuit number (Circuit ID) to the AMF.

A FAN at a first layer, namely, the FAN closest to a residential gateway, identifies the circuit number. For example, a port to which a cable of the residential gateway is connected is the circuit number. The FAN at the first layer adds this para meter to the forwarded message, and then sends the para meter to the AGF along with the message level by level.

An implementation in which the AGF sends the circuit number to the AMF may be as follows.

A. As shown in step 301, the fixed access network (FAN) identifies the NAS message based on L2 or L3 information. The FAN adds the circuit ID to the NAS message, or adds the circuit ID to a NAS message header. The AGF forwards, to the AMF, the NAS message to which the circuit ID is added.

B. The AGF obtains the circuit identifier, and the AGF adds the circuit ID to the sent N2 interface message.

A solution in which the AGF obtains the circuit ID is not limited in this embodiment of this application. For example, the AGF may further obtain the circuit ID based on the configuration information.

303. The AMF selects the SMF after receiving the NAS message.

The AMF may select the SMF based on at least one of slice information, network information, or a type identifier. For example, when the type identifier is a PPPoE type, the AMF may select an SMF that supports PPPoE processing.

304. The AMF forwards the NAS message to the SMF using an N11 interface message.

The NAS message is a PDU session establishment request message based on the foregoing example. A manner in which the AMF sends the NAS message may be as follows: forwarding the PDU session establishment request message to the SMF using an N11 interface message. A name of the N11 interface message is not limited in this embodiment of this application. The N11 interface message is a session request message, or the like.

If the AMF does not obtain the circuit ID in steps 301 and 302, the AMF may instruct the SMF to establish a restricted PDU session. For example, the AMF may send a session restriction indication or a restricted PDU type to the SMF. The restricted PDU session is a PDU session in which a data packet cannot be forwarded to an external network. The data packet cannot be forwarded because the IP address has not been assigned to the CPE, or the data packet of the PDU session can only be cached or discarded even if the IP address is assigned. Correspondingly, an unrestricted PDU session is a normal session, and a data packet received from the PDU session is forwarded to the external network based on a destination IP address. Instructing the SMF to establish the restricted PDU session is content that is optionally executed. Therefore, the restricted session indication and the restricted PDU type belong to an optional parameter.

305. After receiving the NAS message, the SMF selects the UPF, and sends an N4 interface message to the UPF.

The N4 interface message includes packet detection information (PDI). When the type identifier is the PPPoE type, the SMF sends PPPoE packet detection information to the UPF. For example, the PDI includes a PPPoE message type indication, and the PPPoE message type indication includes two parts:

1. A PPPoE discovery packet matches an Ethernet type 0x8863. Optionally, based ona type included in a PPPoE packet header, the PPPoE discovery packet is further specified as a packet sent by a PPPoE user. For example, the type is a PPPoE initiation (PADI) type, a PPPoE request (PADR) type, a PPPoE terminate (PADT) type.

2. A PPPoE session phase packet matches an Ethernet type 0x8864, and a type in a PPPoE packet header is not 0x0021 (is not an Internet Protocol version 4 (IPv4)). Optionally, a message type is further specified as a link control protocol (LCP), a network control protocol (NCP), an IPCP, a challenge handshake authentication protocol (CHAP), a password authentication protocol (PAP), or the like.

Optionally, a PPPoE session ID may be further specified as an ID assigned in a PPPoE discovery process. The PDI may be used to instruct the UPF to detect L2 information of a data packet. When a type parameter that is in the data packet and that is included in an Ethernet packet header matches a PPPoE message type in the PDI, the UPF sends the matched data packet to the SMF.

In addition, if a current PDU session is the restricted PDU session, the SMF instructs the UPF to store or discard another service data packet received on the PDU session. The "another service data packet" is a data packet other than the matched data packet.

There are the following two processing solutions (A) or (B).

The solution (A) is as follows.

306A. The SMF sends an N11 interface reply message, where the N11 interface reply message includes a PDU session establishment success (PDU session establishment accept) message and PDU session information.

The PDU session establishment success message may include an authorized quality of service (QoS) policy, a service continuity mode, and the like. The PDU session information may include a PDU session identifier, a QoS file, and core network tunnel identification information.

307A. The AMF sends, to the AGF through the interface N2, the PDU session establishment success message and the PDU session information that are received in step 306A, and the AGF sends the PDU session establishment success message to the CPE.

For example, the AGF parses the PDU session information to obtain the PDU session identifier. The AGF assigns a special AGF medium access control (MAC) address to the PDU session, and encapsulates the PDU session establishment success message using the MAC address as an AGF source address. The AGF MAC address herein is special because a binding relationship is established between the AGF MAC address and the PDU session, and may also be referred to as a dedicated AGF MAC address.

Herein, the CPE may obtain, from an L2 source MAC address in the PDU session establishment success message, the AGF MAC address corresponding to the PDU session. The CPE may store a correspondence between the PDU session identifier and the special AGF MAC address.

308A. The AGF may further store the core network side tunnel identification information in the PDU session information, and assign a tunnel identifier of the AGF, in other words, assign an AGF tunnel identifier. Then, the AGF sends the AGF tunnel identifier to the AMF using the N2 interface message.

309A. The AMF forwards the AGF tunnel identifier to the SMF, and the SMF forwards the AGF tunnel identifier to the UPF, to update tunnel information. Therefore, a user plane tunnel establishment procedure between the UPF and the AGF is completed.

The solution (B) is as follows.

306B. The SMF sends an N11 interface reply message, where the N11 interface reply message includes PDU session information.

The PDU session information may include a PDU session identifier, a QoS file, core network tunnel identification information, and the like.

307B. The AMF sends the PDU session information to the AGF. The AGF assigns an AGF tunnel identifier. In addition, the AGF obtains the PDU session identifier in the PDU session information, and the AGF assigns a special AGF MAC address to the PDU session.

308B. The AGF sends the assigned AGF tunnel identifier and special AGF MAC address to the AMF, and the AMF forwards the assigned AGF tunnel identifier and special AGFMAC address to the SMF.

309B. The SMF sends the AGF tunnel identifier to the UPF, to update tunnel information.

310B. The SMF generates a PDU session establishment success message, and sends the PDU session establishment success message to the CPE using the AMF and the AGF. The PDU session establishment success message includes an AGF MAC address, and may further include a PDU session identifier.

The CPE obtains, from the PDU session establishment success message, the AGF MAC address corresponding to the PDU session. The CPE stores a correspondence between the PDU session identifier and the AGF MAC address.

311. The CPE initiates a PPPoE procedure or initiates a DHCP procedure to obtain a CPE IP address.

The PPPoE procedure is used as an example. The CPE sends a PPPoE discovery process message, an LCP message, or an NCP request message to the AGF, and encapsulates a PPPoE message using the AGF MAC address corresponding to the PDU session. The NCP has different names according to different protocols, and has a same function as the IPCP.

The FAN may add the circuit ID of the CPE to the PPPoE message and send the PPPoE message to the AGF. Specifically, the FAN may add the circuit ID of the CPE to the PPPoE discovery process message and send the PPPoE discovery process message to the AGF. The AGF may map the AGF MAC address to the PDU session, and send the PPPoE message to the UPF corresponding to the PDU session.

312. The UPF identifies a PPPoE message based on the PDI, and sends the identified PPPoE message to the SMF.

Similarly, a DHCP message may also be identified.

313. The SMF obtains at least one of a circuit ID, a user equipment identifier, a user name, or a user name password included in the PPPoE message, and sends the foregoing information to an authentication function entity. The authentication function entity performs authentication on the CPE based on the at least one of the circuit ID, the user equipment identifier, the user name, or the user name password. For the CPE on which authentication succeeds, the SMF updates a data packet forwarding rule. For example, the SMF may instruct the UPF to normally forward a data packet.

Alternatively, the SMF sends the at least one of the circuit ID, the user equipment identifier, the user name, or the user name password to the AMF, and the AMF performs authentication on the CPE based on the foregoing information. For the CPE on which authentication succeeds, the AMF instructs the SMF to establish the unrestricted PDU session. The SMF updates the data packet forwarding rule according to an indication of the AMF, and instructs the UPF to normally forward the data packet.

In addition, for the CPE on which authentication succeeds, the SMF may assign a PPPoE session ID and a CPE IP address, and send the PPPoE session ID and the CPE IP address to the CPE in the PPPoE procedure.

314. The UPF obtains and stores the PPPoE session ID sent by the SMF. The UPF forwards the PPPoE message to the CPE, and the CPE obtains, in the PPPoE procedure, the PPPoE session ID and the CPE IP address that are assigned by the SM F. The CPE subsequently encapsulates a service data packet using the PPPoE session ID and the CPE IP address.

Figure 4:
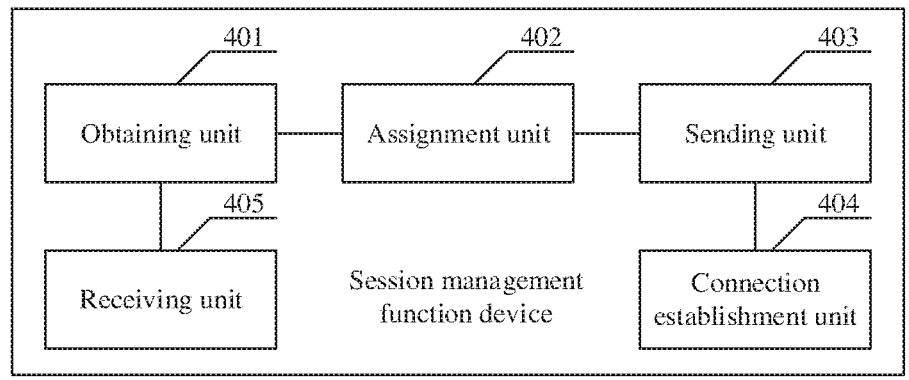
FIG. 4 is a schematic structural diagram of a session management function device according to an embodiment of the present disclosure.

An embodiment of the present disclosure further provides a session management function device. As shown in FIG. 4, the session management function device includes: an obtaining unit 401 configured to obtain a point-to-point protocol over Ethernet (PPPoE) message sent by user equipment; an assignment unit 402 configured to assign a PPPoE session identifier and/or an IP address to the user equipment; and a sending unit 403 configured to send the assigned PPPoE session identifier and/or IP address to the user equipment, to establish a PPPoE connection between the user equipment and a network side device.

Herein, the session management function may further include a connection establishment unit 404 configured to establish a PPPoE connection between the user equipment and the session management function (SMF).

The sending unit 403 is further configured to, before the PPPoE message is obtained, send a request message to a user plane function (UPF), where the request message is used to instruct the UPF to send the obtained PPPoE message to the session management function SMF.

Alternatively, the session management function further includes: a receiving unit 405 configured to, before the PPPoE message is obtained, receive a non-access stratum (NAS) request message sent by the user equipment, where the NAS request message includes the PPPoE message.

Optionally, that the request message is used to instruct the UPF to send the obtained PPPoE message to the SMF includes that the request message includes packet detection information (PDI), and the PDI is used to instruct the UPF to identify a data packet in which a type parameter that is in the data packet and that is included in an Ethernet packet header matches a PPPoE message type included in the PDI, and to send the matched data packet to the SMF; or the request message includes PDI and a forwarding action rule (FAR), the PDI is used to instruct the UPF to identify a data packet in which a type parameter that is in the data packet and that is included in an Ethernet packet header matches a PPPoE message type included in the PDI, and the forwarding action rule is used to instruct to send the matched data packet to the SMF.

Optionally, that the PDI is used to instruct the UPF to identify the type parameter that is in the data packet and that is included in the Ethernet packet header includes the following.

The PDI is used to instruct the UPF to identify layer 2 information of the data packet, to obtain the type parameter included.in the Ethernet packet header.

Optionally, that a sending unit 403 is configured to send the assigned PPPoE session identifier and/or IP address to the user equipment includes: encapsulating the PPPoE session identifier and/or the IP address in the PPPoE message, and sending the PPPoE message to the user equipment; or sending the assigned PPPoE session identifier and/or IP address to the user equipment using a NAS message.

The sending unit 403 is further configured to, if encapsulating the PPPoE session identifier and/or the IP address in the PPPoE message, encapsulate the PPPoE message using a medium access control (MAC) address of the UPF as a source MAC address; and send the encapsulated PPPoE message to the user equipment using the UPF.

The obtaining unit 401 is further configured to receive a data packet that is sent by the UPF and that includes the PPPoE message, and obtain at least one of a circuit number, a user equipment identifier, a user name, and a user password from the PPPoE message. Alternatively, the abtaining unit is configured to receive at least one of a circuit number, a user equipment identifier, a user name, or a user password that are sent by the UPF. Alternatively, the abtaining unit is configured to obtain at least one of a circuit number, a user equipment identifier, a user name, or a user password from the NAS message.

The sending unit 403 is further configured to send the at least one of the circuit number, the user equipment identifier, the user name, or the user password to an access and mobility management function (AMF) and/or an authentication entity.

Optionally, that an assignment unit 402 is configured to assign a PPPoE session identifier and/or an IP address to the user equipment includes assigning the PPPoE session identifier and/or the IP address to the user equipment according to an indication of the AMF or an indication of the authentication entity.

The session management function device further includes: a receiving unit 405 configured to, before the SMF obtains the PPPoE message sent by the user equipment, receive a packet data unit (PDU) session establishment request message, where the PDU session establishment request message includes a manner used to instruct the user equipment to obtain the IP address based on a PPPoE procedure, or includes information used to indicate a fixed network access type, or includes information used to indicate a fixed network service; or receive an IP index sent by a policy control function PCF, where the IP index is used to indicate a manner in which the user equipment obtains the IP address based on a PPPoE procedure.

The session management function device further includes the following.

The receiving unit 405 is configured to receive a MAC address that is of an access gateway function (AGF) and that is assigned by the AGF to a PDU session of the user equipment.

The sending unit 403 is further configured to send a PDU session establishment success message to the user equipment, where the PDU session establishment success message includes the MAC address of the AGF.

The receiving unit 405 is further configured to: if the request message is used to instruct the UPF to send the obtained PPPoE message to the SMF, after the PDU session establishment success message is sent to the user equipment, receive the PPPoE message that is from the user equipment and that is sent by the UPF, where the PPPoE message is used in a PPPoE discovery process, an internet protocol control protocol (I PCP) process, or a link control protocol (LCP) process.

Figure 5:
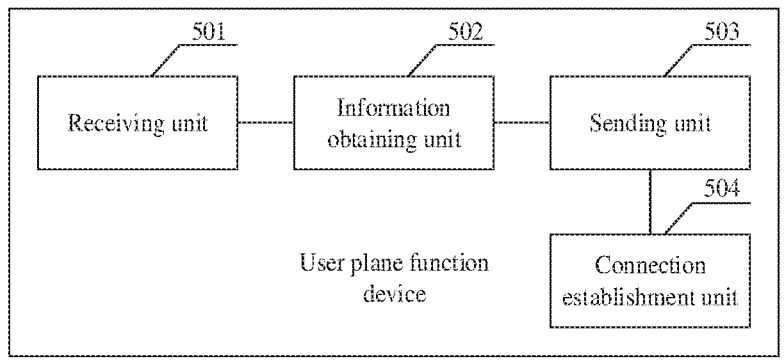
FIG. 5 is a schematic structural diagram of a user plane function device according to an embodiment of the present disclosure.

An embodiment of the present disclosure further provides a user plane function device. As shown in FIG. 5, the user plane function device includes: a receiving unit 501 configured to receive a request message from an SMF; an information obtaining unit 502 configured to: obtain a PPPoE message based on the request message; and obtain a PPPoE session identifier and/or an IP address that are/is assigned to user equipment that sends the PPPoE message; and a sending unit 503, configured to send the PPPoE session identifier and/or the IP address to the user equipment, to establish a PPPoE connection between the user equipment and a network side device.

The user plane function device may further include a connection establishment unit 504 configured to establish a PPPoE connection between the user equipment and the user plane device.

Optionally, the request message includes that the request message is used to instruct the UPF to send the obtained PPPoE message to the SMF; or the request message is used to instruct the UPF to obtain the PPPoE message; or the request message carries the PPPoE message sent to the UPF.

Optionally, if the request message is used to instruct the UPF to obtain the PPPoE message, the request message is further used to instruct to send, to the SMF, at least one of a circuit number, a user equipment identifier, a user name, and a user password that are carried in the PPPoE message.

Optionally, that the request message is used to instruct the UPF to obtain the PPPoE message includes that the request message includes PDI, and the PDI is used to instruct the UPF to identify a data packet in which a type parameter in the data packet matches a PPPoE message type included in the PDI, and to forward the identified data packet in the PPPoE message type to the SMF.

Optionally, the information obtaining unit 502 is configured to: if the request message is used to instruct the UPF to send the obtained PPPoE message to the SMF, receive the PPPoE message sent by the SMF, where the PPPoE message includes the PPPoE session identifier and/or the IP address.

Optionally, in the PPPoE message, a MAC address of the UPF is a source MAC address.

Optionally, the information obtaining unit 502 is configured to: if the request message is used to instruct the UPF to obtain the PPPoE message, or if the request message carries the PPPoE message sent to the UPF, assign the PPPoE session identifier and/or the IP address to the user equipment based on the request message.

The sending unit 503 is configured to send a PPPoE reply message to the user equipment; and send the assigned PPPoE session identifier and/or IP address to the user equipment using the PPPoE reply message.

The receiving unit 501 is further configured to receive at least one of a circuit number, a user equipment identifier, a user name, or a user password that are sent by the SMF.

The sending unit 503 is further configured to send the at least one of the circuit number, the user equipment identifier, the user name, or the user password to an authentication entity for authentication.

Figure 6:
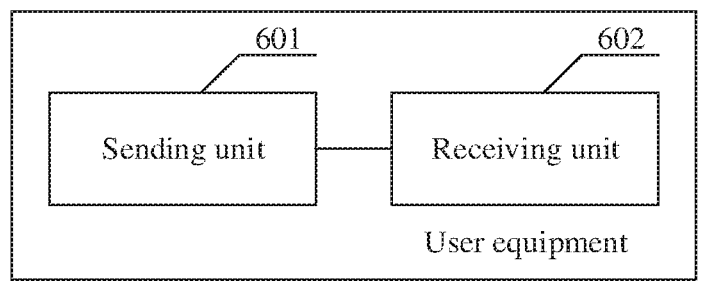
FIG. 6 is a schematic structural diagram of user equipment according to an embodiment of the present disclosure.

An embodiment of the present disclosure further provides user equipment. As shown in FIG. 6, the user equipment includes: a sending unit 601 configured to: after a packet data unit PDU session is established, send a PPPoE message to an AGF, where the PPPoE message is used in at least one of a PPPoE discovery process, an IPCP process, or an LCP process, and the PPPoE message is encapsulated using a MAC address that is of the AGF and that corresponds to the PDU session, or the PPPoE message is encapsulated using a MAC address that is of a UPF and that corresponds to a PPPoE session; and a receiving unit 602 configured to receive a PPPoE session identifier or an IP address, to establish a PPPoE connection between the user equipment and a network side device.

The sending unit 601 is further configured to: before sending the PPPoE message to the AGF, send a PDU session establishment request message to the AGF, where the PDU session establishment request message includes the PPPoE message. Alternatively, the PDU session establishment request message includes a manner used to instruct the user equipment to obtain the IP address based on a PPPoE procedure, or includes information used to indicate a fixed network access type, or includes information used to indicate a fixed network service.

Optionally, the PDU session establishment request message is encapsulated in anon-access stratum (NAS) message.

The NAS message is encapsulated in a layer 2 data packet, and the NAS message is identified using a virtual local area network (VLAN) label, a multiprotocol label switching (MPLS) label, or the MAC address of the AGF, or the NAS message is identified using an Ethernet type.

Alternatively, the NAS message is encapsulated in a layer 3 data packet, and the NAS message is identified using a UDP port number or a predetermined destination IP address.

Alternatively, the NAS message is encapsulated in the PPPoE session, and the PPPoE session identifier is used to identify the NAS message.

Alternatively, the NAS message is encapsulated in a GRE tunnel, and a GRE tunnel identifier is used to identify the NAS message.

Alternatively, the NAS message is encapsulated in an EAP message, and the NAS message is identified using an EAP parameter.

Alternatively, the NAS message is encapsulated in a predetermined protocol layer, and the NAS message is identified using the predetermined protocol layer.

The receiving unit 602 is further configured to receive a PDU session establishment success message returned by the AGF or an SMF, where the PDU session establishment success message includes the MAC address that is of the AGF and that is assigned by the AGF to the PDU session, or the PDU session establishment success message is encapsulated in the MAC address that is of the AGF and that is assigned by the AGF to the PDU session.

The receiving unit 602 is further configured to receive a PPPoE reply message, where the PPPoE reply message includes the MAC address that is of the UPF and that corresponds to the PPPoE session.

Figure 7:
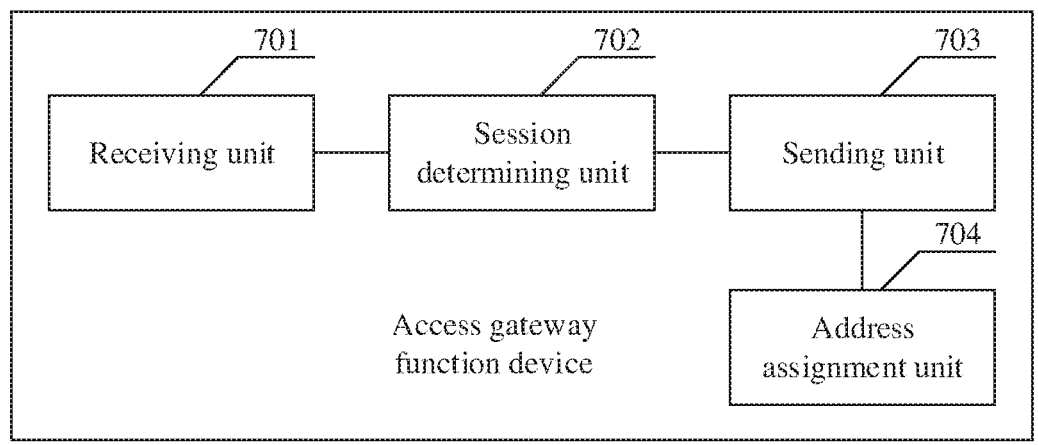
FIG. 7 is a schematic structural diagram of an access network function device according to an embodiment of the present disclosure.

An embodiment of the present disclosure further provides an access gateway function device. As shown in FIG. 7, the access gateway function device includes: a receiving unit 701 configured to receive a PPPoE message sent by user equipment, where the PPPoE message is used in a PPPoE discovery process, an IPCP process, or an LCP process, and the PPPoE message is encapsulated using a MAC address of the AGF or a MAC address of a UPF; a session determining unit 702 configured to determine a packet data unit PDU session corresponding to the MAC address of the AGF; and a sending unit 703 configured to: forward the PPPoE message to the UPF corresponding to the PDU session; or send the PPPoE message to the UPF based on the MAC address of the UPF, where the receiving unit 701 is further configured to receive a PPPoE session identifier and/or an IP address; and the sending unit 703 is further configured to forward the PPPoE session identifier and/or the IP address to the user equipment, such that the user equipment establishes a PPPoE connection to a network side device.

The receiving unit 701 is further configured to, before receiving the PPPoE message sent by the user equipment, receive a PDU session establishment request message sent by the user equipment, where the PDU session establishment request message includes a manner used to instruct the user equipment to obtain the IP address based on a PPPoE procedure, or includes information used to indicate a fixed network access type, or includes information used to indicate a fixed network service.

The sending unit 703 is further configured to forward the PDU session establishment request message to an AMF.

Optionally, the PDU session establishment request message is encapsulated in an NAS message.

The NAS message is encapsulated in a layer 2 data packet, and the NAS message is identified using a VLAN label, a MPLS label, or the MAC address of the AGF, or the NAS message is identified using an Ethernet type.

Alternatively, the NAS message is encapsulated in a layer 3 data packet, and the NAS message is identified using a UDP port number or a predetermined destination IP address.

Alternatively, the NAS message is encapsulated in a PPPoE session, and the PPPoE session identifier is used to identify the NAS message.

Alternatively, the NAS message is encapsulated in a GRE tunnel, and a GRE tunnel identifier is used to identify the NAS message.

Alternatively, the NAS message is encapsulated in an EAP message, and the NAS message is identified using an EAP parameter.

Alternatively, the NAS message is encapsulated in a predetermined protocol layer, and the NAS message is identified using the predetermined protocol layer.

The sending unit 703 is further configured to forward the NAS message, where the NAS message includes a number of a circuit accessed by the user equipment.

The access gateway function device further includes an address assignment unit 704 configured to assign the MAC address of the AGF to the PDU session, where the sending unit 703 is further configured to send the assigned MAC address of the AGF to the user equipment.

Optionally, that the sending unit 703 is configured to send the assigned MAC address of the AGF to the user equipment includes: encapsulating a PDU session establishment success message using the MAC address of the AGF, and sending the PDU session establishment success message to the user equipment; or sending the MAC address of the AGF to an SMF, such that the SMF adds the MAC address of the AGF to the PDU session establishment success message, and sends the PDU session establishment success message to the user equipment.

Figure 8:
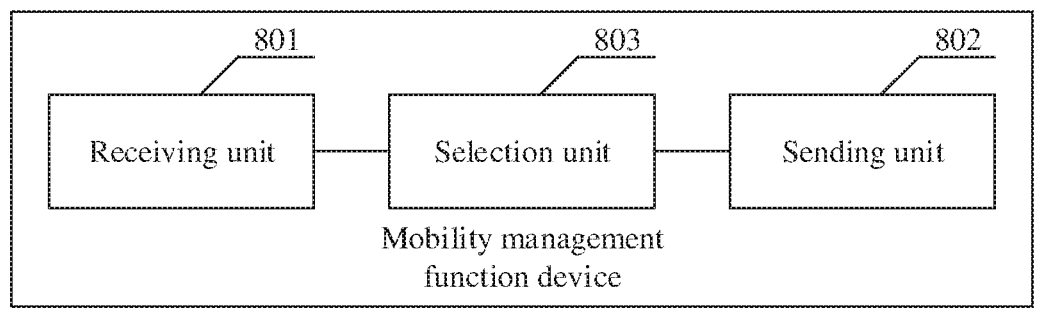
FIG. 8 is a schematic structural diagram of a mobility management function according to an embodiment of the present disclosure.

An embodiment of the present disclosure further provides a mobility management function device. As shown in FIG. 8, the mobility management function device includes: a receiving unit 801 configured to receive a packet data unit (PDU) session establishment request message sent by an AGF, where the PDU session establishment request message includes a manner used to instruct user equipment to obtain an IP address based on a PPPoE procedure, or includes information used to indicate a fixed network access type, or includes information used to indicate a fixed network service, where the receiving unit 801 is further configured to receive a PDU session establishment success message returned by an SMF; and a sending unit 802 configured to send the PDU session establishment success message to the user equipment using the AGF.

Alternatively, the receiving unit 801 is configured to receive a MAC address that is of the AGF and that is assigned by the AGF to a PDU session. The sending unit 802 is configured to send the MAC address of the AGF to the SMF.

The mobility management function device further includes a selection unit 803 configured to select the SMF according to the indication information in the PDU session establishment request message, where the sending unit 802 is further configured to send the PDU session establishment request message to the SMF.

The sending unit 802 is further configured to send an instruction to the SMF, to instruct the SMF to obtain at least one of a circuit number, a user equipment identifier, a user name, or a user password.

The receiving unit 801 is further configured to: after the instruction is sent to the SMF, receive the at least one of the circuit number, the user equipment identifier, the user name, or the user password that are sent by the SMF.

The sending unit 802 is further configured to send the at least one of the circuit number, the user equipment identifier, the user name, or the user password to an authentication entity.

The sending unit 802 is further configured to: when authentication on the user equipment succeeds, indicate, to the SMF, that authentication on the user equipment succeeds.

Figure 9:
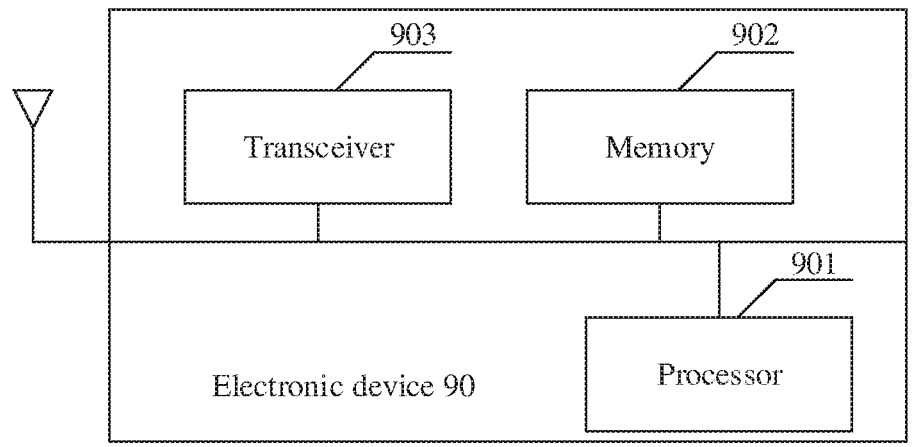
FIG. 9 is a schematic structuraL diagram of an electronic device according to an embodiment of the present disclosure.

FIG. 9 shows an electronic device 90 according to an embodiment of the present disclosure. The electronic device 90 includes a processor 901, a memory 902, and a transceiver 903. The processor 901, the memory 902, and the transceiver 903 may be interconnected using a bus.

The memory 902 includes but is not limited to a random access memory (RAM), a read-only memory (ROM), an erasable programmable read-only memory (EPROM), or a compact disc read-only memory (CD-ROM). The memory 902 is configured to store related instructions and data. The transceiver 903 is configured to receive and send data. Therefore, in this embodiment, the transceiver 903 may be mapped to the sending unit and the receiving unit in the foregoing embodiments, and a function of another unit may be mapped to a function of the processor 901.

The processor 901 may be one or more central processing units (CPU). When the processor 901 is one CPU, the CPU may be a single-core CPU or a multi-core CPU.

The processor 901 in the device 90 is configured to read program code stored in the memory 902, to perform the steps in the methods in the foregoing method embodiments or the summary. Details are not described herein again.

The electronic device 90 may be an entity device such as user equipment, an AGF, or an AMF in this embodiment of the present disclosure. This depends on specific content performed by the electronic device 90.

Figure 10:
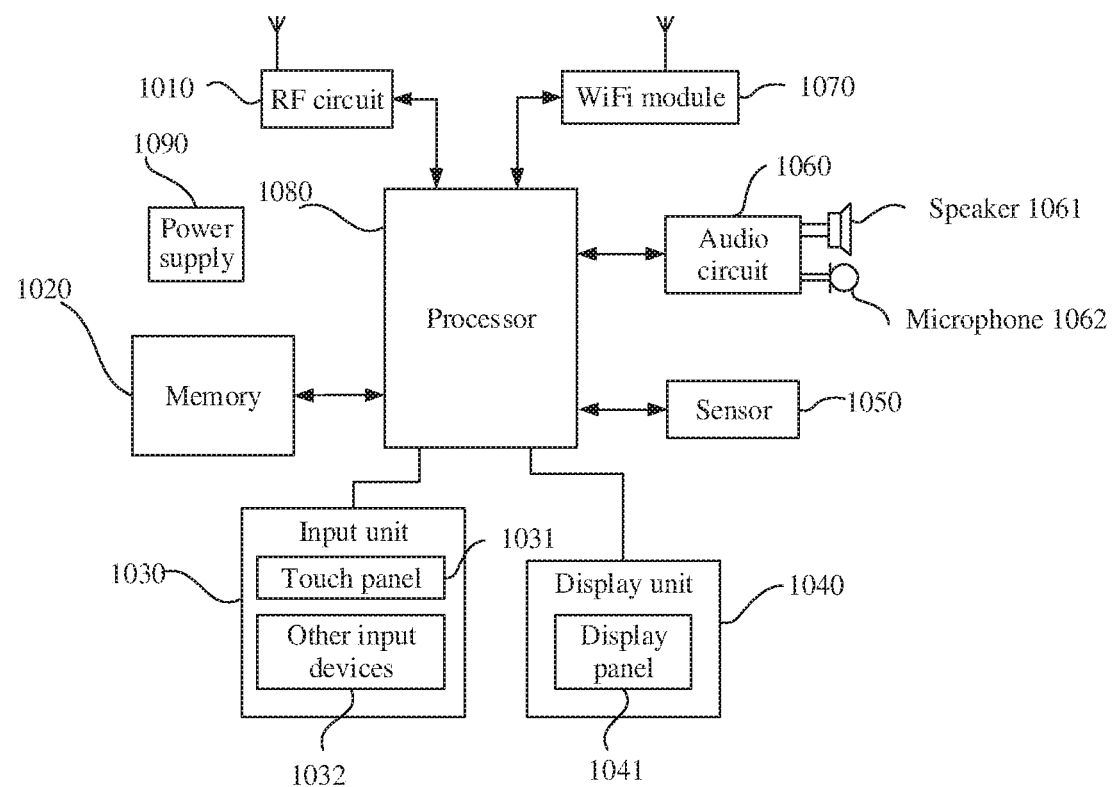
FIG. 10 is a schematic structural diagram of user equipment according to an embodiment of the present disclosure.

In an example, FIG. 10 shows an example of a hardware structure of user equipment. For ease of description, FIG. 10 shows only a part related to this embodiment of the present disclosure. For technical details that are not disclosed, refer to the method part in this embodiment of the present disclosure. The user equipment may be any user equipment including a mobile phone, a tablet computer, a PDA (Personal Digital Assistant), a POS (Point of Sales), a nin-vehicle computer, or the like. For example, the user equipment is the mobile phone.

FIG. 10 is a block diagram of a partial structure of a mobile phone related to the user equipment provided in this embodiment of the present disclosure. Referring to FIG. 10, the mobile phone includes components such as a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. A person skilled in the art may understand that the structure of the mobile phone shown in FIG. 10 constitutes no limitation on the mobile phone. The mobile phone may include more or fewer components than those shown in the figure, may combine some components, or may have different component arrangements.

The following describes each constituent component of the mobile phone in detail with reference to FIG. 10.

The RF circuit 1010 may be configured to receive and send a signal in an information receiving and sending process or a call process. In particular, the RF circuit 1010 receives downlink information from a base station, and then sends the downlink information to the processor 1080 for processing. In addition, the RF circuit 1010 sends related uplink data to the base station. Usually, the RF circuit 1010 includes but is not limited to an antenna, at least one amplifier, a transceiver, a coupler, a low noise amplifier (LNA), a duplexer, and the like. In addition, the RF circuit 1010 may further communicate with a network and another device through wireless communication. Any communications standard or protocol may be used for the wireless communication, including but not limited to a global system for mobile communications (GSM), a general packet radio service (GPRS), a code division multiple access (CDMA) system, a wideband code division multiple access (WCDMA) system, a long term evolution (LTE) system, an email, a short message service (SMS), and the like.

The memory 1020 may be configured to store a software program and a module. The processor 1080 performs various function applications of the mobile phone and data processing by running the software program and the module that are stored in the memory 1020. The memory 1020 may mainly include a program storage area and a data storage area. The program storage area may store an operating system, an application program required by at least one function (for example, a sound play function and an image play function), and the like. The data storage area may store data (for example, audio data and an address book) created based on use of the mobile phone, and the like. In addition, the memory 1020 may include a high speed random access memory, and may further include a nonvolatile memory, for example, at least one magnetic disk storage device, a flash memory device, or another volatile solid-state storage device.

The input unit 1030 may be configured to: receive entered number or character information; and generate a key signal input related to a user setting and function control of the mobile phone. Specifically, the input unit 1030 may include a touch panel 1031 and other input devices 1032. The touch panel 1031, also referred to as a touchscreen, may collect a touch operation (for example, an operation performed by a user on or near the touch panel 1031 using any proper object or accessory such as a finger or a stylus) performed by the user on or near the touch panel 1031, and drive a corresponding connection apparatus based on a preset program. Optionally, the touch panel 1031 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 1080, and can receive and execute a command sent by the processor 1080. In addition, the touch panel 1031 may be implemented in a plurality of types, such as a resistive type, a capacitive type, an infrared type, and a surface acoustic wave type. The input unit 1030 may include the other input devices 1032 in addition to the touch panel 1031. Specifically, the other input devices 1032 may include but are not limited to one or more of a physical keyboard, a function key (for example, a volume control key or an on/off key), a trackball, a mouse, a joystick, and the like.

The display unit 1040 may be configured to display information entered by the user or information provided for the user, and various menus of the mobile phone. The display unit 1040 may include a display panel 1041. Optionally, the display panel 1041 may be configured in a form of a liquid crystal display (LCD), an organic light-emitting diode (OLED), or the like. Further, the touch panel 1031 may cover the display panel 1041. After detecting the touch operation on or near the touch panel 1031, the touch panel 1031 transmits the touch operation to the processor 1080 to determine a type of a touch event, and then the processor 1080 provides a corresponding visual output on the display panel 1041 based on the type of the touch event. In FIG. 10, the touch panel 1031 and the display panel 1041 are used as two independent components to implement input and output functions of the mobile phone. However, in some embodiments, the touch panel 1031 and the display panel 1041 may be integrated to implement the input and output functions of the mobile phone.

The mobile phone may further include at least one sensor 1050, for example, a light sensor, a motion sensor, and another sensor. Specifically, the light sensor may include an ambient light sensor and a proximity sensor. The ambient light sensor may adjust luminance of the display panel 1041 based on brightness of ambient light. The proximity sensor may turn off the display panel 1041 and/or backlight when the mobile phone approaches to an ear. As a type of motion sensor, an accelerometer sensor may detect values of acceleration in all directions (usually, three axes), may detect a value and a direction of gravity when the accelerometer sensor is static, and may be used in an application that identifies a mobile phone posture (such as screen switching between a landscape mode and a portrait mode, a related game, or magnetometer posture calibration), a function related to vibration identification (such as a pedometer or a strike), and the like. Other sensors such as a gyroscope, a barometer, a hygrometer, a thermometer, and an infrared sensor may be further configured in the mobile phone. Details are not described herein.

The audio circuit 1060, a speaker 1061, and a microphone 1062 may provide an audio interface between the user and the mobile phone. The audio circuit 1060 may convert received audio data into an electrical signal, and transmit the electrical signal to the speaker 1061, and the speaker 1061 converts the electrical signal into a sound signal for output. In addition, the microphone 1062 converts a collected sound signal into an electrical signal. The audio circuit 1060 receives the electrical signal, converts the electrical signal into audio data, and then outputs the audio data to the processor 1080 for processing. The processor 1080 sends the audio data to, for example, another mobile phone using the RF circuit 1010, or outputs the audio data to the memory 1020 for further processing.

WiFi belongs to a short-distance wireless transmission technology. The mobile phone may help, using the WiFi module 1070, the user receive and send an email, browse a web page, access streaming media, and the like. The WiFi module 1070 provides wireless broadband internet access for the user. Although FIG. 10 shows the WiFi module 1070, it may be understood that the WiFi module 1070 is not a mandatory component of the mobile phone, and may be completely omitted based on a requirement without changing the essence of the present disclosure.

The processor 1080 is a control center of the mobile phone, connects each part of the entire mobile phone using various interfaces and lines, and performs various functions of the mobile phone and data processing by running or executing the software program and/or the module that are/is stored in the memory 1020 and invoking data stored in the memory 1020, to perform overall monitoring on the mobile phone. Optionally, the processor 1080 may include one or more processing units. Preferably, an application processor and a modem processor may be integrated into the processor 1080. The application processor mainly processes an operating system, a user interface, an application program, and the like. The modem processor mainly processes wireless communication. It may be understood that the modem processor may alternatively not be integrated into the processor 1080.

The mobile phone further includes the power supply 1090 (for example, a battery) supplying power to the components. Preferably, the power supply 1090 may be logically connected to the processor 1080 using a power management system, to implement functions such as management of charging, discharging, and power consumption using the power management system.

Although not shown, the mobile phone may further include a camera, a Bluetooth module, and the like. Details are not described herein.

In this embodiment of the present disclosure, the processor 1080 included in the user equipment has a function corresponding to the processor 901 in the foregoing embodiment, and the RF circuit 1010 and the WiFi module 1070 may be mapped to functions of the sending unit and the receiving unit of the user equipment. For detailed descriptions of the executed functions, refer to the method embodiment and the apparatus embodiment of the user equipment. Details are not described herein again.

An embodiment of the present disclosure further provides a computer program product. The computer program product includes an executable instruction, and when the executable instruction is executed, any method procedure provided in the embodiments of the present disclosure is implemented.

An embodiment of the present disclosure further provides a computer storage medium. The computer storage medium includes an executable instruction, and when the executable instruction is executed, any method procedure in the embodiments of the present disclosure is implemented. A person of ordinary skill in the art may understand that all or some of the procedures of the methods in the embodiments may be implemented by a computer program instructing related hardware. The program may be stored in a computer readable storage medium. When the program is executed, the procedures in the method embodiments may be included. The foregoing storage medium includes any medium that can store program code, for example, a ROM, a random access memory RAM, a magnetic disk, or an optical disk.

What is claimed is:

1. A session management method, comprising:
   sending, by a user equipment after establishing a packet data unit (PDU) session, a point-to-point protocol over Ethernet (PPPoE) message to an access gateway function (AGF), wherein the PPPoE message is for use in at least one of a PPPoE discovery process, an internet protocol control protocol (IPCP) process, or a link control protocol (LCP) process, and wherein the PPPoE message is encapsulated using one of a medium access control (MAC) address that is of the AGF and corresponds to the PDU session or a MAC address that is of a user plane function (UPF) and that corresponds to a PPPoE session; and
   receiving, by the user equipment, a PPPoE session identifier and/or an Internet Protocol (IP) address to establish a PPPoE connection between the user equipment and a network side device.

2. The session management method according to claim 1, wherein before sending the PPPoE message, the session management method further comprises sending, by the user equipment, a PDU session establishment request message to the AGF, wherein the PDU session establishment request message comprises:
   the PPPoE message;
   a manner for instructing the user equipment to obtain the IP address based on a PPPoE procedure;
   information indicating a fixed network access type; or
   information indicating a fixed network service.

3. The session management method according to claim 2, wherein the PDU session establishment request message is encapsulated in a non-access stratum (NAS) message, and wherein the NAS message is:
   encapsulated in a layer 2 data packet and identified using one of a virtual local area network (VLAN) label, a multiprotocol label switching (MPLS) label, the MAC address of the AGF, or an Ethernet type;
   encapsulated in a layer 3 data packet and identified using a user datagram protocol (UDP) port number or a predetermined destination IP address;
   encapsulated in the PPPoE session and identified using the PPPoE session identifier;
   encapsulated in a generic routing encapsulation (GRE) tunnel and identified using a GRE tunnel identifier;
   encapsulated in an extensible authentication protocol (EAP) message and identified using an EAP parameter; or
   encapsulated in a predetermined protocol layer and identified using the predetermined protocol layer.

4. The session management method according to claim 3, further comprising receiving, by the user equipment, a PDU session establishment success message, wherein the PDU session establishment success message comprises the MAC address that is of the AGF and that is assigned by the AGF to the PDU session, or wherein the PDU session establishment success message is encapsulated in the MAC address that is of the AGF and that is assigned by the AGF to the PDU session.

5. An apparatus, comprising:
   a processor; and
   a memory coupled to the processor and having program instructions stored thereon which, when executed by the processor, cause the apparatus to:
      send a point-to-point protocol over Ethernet (PPPoE) message to an access gateway function (AGF) after establishing a packet data unit (PDU) session, wherein the PPPoE message is used in at least one of a PPPoE discovery process, an internet protocol control protocol (IPCP) process, or a link control protocol (LCP) process, and wherein the PPPoE message is encapsulated using one of a medium access control (MAC) address that is of the AGF and that corresponds to the PDU session or a MAC address that is of a user plane function (UPF) and that corresponds to a PPPoE session; and
      receive a PPPoE session identifier or an Internet Protocol (IP) address to establish a PPPoE connection between the apparatus and a network side device.

6. The apparatus according to claim 5, wherein the program instructions, when executed by the processor, further cause the apparatus to send a PDU session establishment request message to the AGF, wherein the PDU session establishment request message comprises:
   the PPPoE message;
   a manner for instructing the apparatus to obtain the IP address based on a PPPoE procedure; or
   information indicating a fixed network access type; or
   information indicating a fixed network service.

7. The apparatus according to claim 6, wherein the PDU session establishment request message is encapsulated in a non-access stratum (NAS) message, and wherein the NAS message is:
   encapsulated in a layer 2 data packet and identified using one of a virtual local area network (VLAN) label, a multiprotocol label switching (MPLS) label, the MAC address of the AGF, or an Ethernet type;
encapsulated in a layer 3 data packet and identified using a user datagram protocol (UDP) port number or a predetermined destination IP address;
encapsulated in the PPPoE session and identified using the PPPoE session identifier;
encapsulated in a generic routing encapsulation (GRE) tunnel and identified using a GRE tunnel identifier;
encapsulated in an extensible authentication protocol (EAP) message identified using an EAP parameter; or
encapsulated in a predetermined protocol layer and identified using the predetermined protocol layer.

8. The apparatus according to claim 7, wherein the program instructions, when executed by the processor, further cause the apparatus to receive a PDU session establishment success message, and wherein the PDU session establishment success message comprises the MAC address that is of the AGF and that is assigned by the AGF to the PDU session, or wherein the PDU session establishment success message is encapsulated in the MAC address that is of the AGF and that is assigned by the AGF to the PDU session.

* * * * *